ROBERT N. MELLOTT
CLAUDE F. KING
NORMAN M. MARTIN
RAMON E. WOLFE
INVENTORS

BY Samuel Lindenberg
Arthur Frelich

ROBERT N. MELLOTT
CLAUDE F. KING
NORMAN M. MARTIN
RAMON E. WOLFE
INVENTORS

BY Samuel Lindenberg
Arthur Frederick

| 7 | 6 | 5 | 4 | 3 | 2 | 1 | 0 | |
|---|---|---|---|---|---|---|---|---|
| $I_0$ | Ac EXP | Ac SIGN | $Ac_4$ | $Ac_3$ | $Ac_2$ | $Ac_1$ | $Ac_0$ | 0 |
| $I_1$ | Z1 EXP | Z1 SIGN | $Z1_4$ | $Z1_3$ | $Z1_2$ | $Z1_1$ | $Z1_0$ | 8 |
| $I_2$ | Z2 EXP | Z2 SIGN | $Z2_4$ | $Z2_3$ | $Z2_2$ | $Z2_1$ | $Z2_0$ | 16 |
| $I_3$ | Z3 EXP | Z3 SIGN | $Z3_4$ | $Z3_3$ | $Z3_2$ | $Z3_1$ | $Z3_0$ | 24 |
| $I_4$ | | | | | | | $Z4_0$ | 32 |
| $I_5$ | | | | | | | $Z5_0$ | 40 |
| $I_6$ | | | | | | | $Z6_0$ | 48 |
| $I_7$ | | | | | | | $Z7_0$ | 56 |
| $I_8$ | | | | | | | $Z8_0$ | 64 |
| $I_9$ | | | | | | | $Z9_0$ | 72 |
| $I_{10}$ | | | | | | | $A_0$ | 80 |
| $I_{11}$ | | | | | | | $ZB_0$ | 88 |
| $I_{12}$ | | | | | | | $ZE_0$ | 96 |
| $I_{13}$ | | | | | | | $ZC_0$ | 104 |
| $I_{14}$ | | | | | | | $ZD_0$ | 112 |
| $I_{15}$ | | | | | | | $CI1_0$ | 120 |
| M8 | M7 | M6 | M5 | M4 | M3 | M2 | M1 | 128 |
| | | MD | MC | ME | MB | MA | M9 | 136 |
| | | | | | | PS2 | PS1 | 144 |
| | | | | | | | | 152 |
| | | | | | | | | 160 |
| ⋮ | ⋮ | ⋮ | ⋮ | ⋮ | ⋮ | ⋮ | ⋮ | ⋮ |
| | | | | | | | | 232 |
| | | | | | | | | 240 |
| PS112 | | | | | | | PS105 | 248 |

FIG. 3

ROBERT N. MELLOTT
CLAUDE F. KING
NORMAN M. MARTIN
RAMON E. WOLFE
INVENTORS

BY Samuel Lindenberg
Arthur Freilich

ELECTRONIC CALCULATOR.

Filed Aug. 12, 1966 7 Sheets-Sheet 4

ROBERT N. MELLOTT
CLAUDE F. KING
NORMAN M. MARTIN
RAMON E. WOLFE
INVENTORS

BY Samuel Lindenberg
Arthur Freilich

ROBERT N. MELLOTT
CLAUDE F. KING
NORMAN M. MARTIN
RAMON E. WOLFE
INVENTORS.
BY Samuel Lindenberg
Arthur Freilich ROBERT N. MELLOTT
CLAUDE F. KING
NORMAN M. MARTIN
RAMON E. WOLFE
INVENTORS
BY Samuel Lindenberg
Arthur Freilich ROBERT N. MELLOTT
CLAUDE F. KING
NORMAN M. MARTIN
RAMON E. WOLFE
INVENTORS.
BY Samuel Lindenberg
Arthur Frelich

United States Patent Office 3,487,369
Patented Dec. 30, 1969

3,487,369

ELECTRONIC CALCULATOR

Claude F. King, Rolling Hills, Calif., Norman M. Martin, Austin, Tex., Robert N. Mellott, Palos Verdes Estates, and Ramon E. Wolfe, San Diego, Calif., assignors to Logicon, Inc., Redondo Beach, Calif., a corporation of California Filed Aug. 12, 1966, Ser. No. 572,021
Int. Cl. G11b *13/00;* G08b *23/00*
U.S. Cl. 340—172.5 19 Claims

ABSTRACT OF THE DISCLOSURE

An electronic calculator apparatus including numeric and operation keyboards, memory and logic means, and a display device. The calculator hardware is organized so that each user level operation is actually executed by performing a sequence of internal instructions as defined by internal instruction codes sequentially read from the memory. Each internal instruction code, in turn, defines a unique sequence of states during which an elemental operation is performed. The memory preferably comprises a magnetic core memory in which each sequence of internal instruction codes is wired in. Thus, by selecting a memory location and energizing a particular instruct code wire, a predetermined internal instruction code will be automatically written into the selected location. The same memory locations which are threaded by instruction code wires for the purpose of writing fixed data (i.e. internal instruction codes) therein, are also used for storing variable data.

This invention relates generally to an electronic apparatus for performing arithmetic operations in response to either manual keyboard actuations or stored manifestations of such actuations.

A need has been recognized in recent years for apparatus having capabilities lying somewhere in the large void between digital computers and mechanical calculators. Digital computers are generally considered as devices which are able to store large quantities of data and perform logical and arithmetic operations with respect to such data in response to a stored sequence of instructions or a program. Such a program is stored in some type of memory, e.g. in a magnetic disk or in the computer's core memory. Mechanical calculators on the other hand usually are capable of storing only a small amount of data, e.g. a few multidigit numbers and of performing all operations in response to actual manual key actuations.

Although the capabilities of even a small digital computer dwarf the capabilities of even a large mechanical calculator, the cost of such a computer also dwarfs the cost of the calculator. Consequently, it has been recognized that a need exists for apparatus which can be considered to represent a compromise between the computer and the calculator. Such apparatus would be capable of being operated either by manual keyboard actuations or by a sequence of stored manifestations representing such actuations. In addition, it would have to cost considerably less than a computer but may cost somewhat more than a mechanical calculator.

It is an object of the present invention to provide such an apparatus which may hereinafter be referred to as an electronic calculator.

Briefly, in accordance with the present invention, an apparatus is provided including a keyboard having essentially three different sets of keys; namely a set of numeric keys, a set of operation keys and a set of mode keys. Internally, the apparatus is comprised of a magnetic core memory including a plurality of data registers, a plurality of flip-flop registers external to the memory and various control and logic circuits.

A user can transfer a multidigit number in a selected data register in the memory by defining the number and identifying the register via the numeric keyboard and then actuating an operation key defining a TRANSFER operation. Operations with respect to numbers stored in the memory registers can then be initiated by actuating the keys identifying the registers and the keys corresponding to the desired operations. Exemplary of such operations are the four basic arithmetic operations: namely ADD, SUBTRACT, DIVIDE, MULTIPLY.

In accordance with a significant aspect of the present invention, in order to perform the various operations with a minimum of hardware, each operation is performed in response to a sequence of internal (I level) instruction codes read from the memory. Each such internal instruction code in turn defines a unique sequence of different states. During each state, an elemental operation, e.g. a memory access is performed, each elemental operation occurring in response to a different clock pulse.

In accordance with a futher significant aspect of the present invention, a magnetic core memory is employed and each sequence of internal instruction codes is wired into the core memory. Thus, for example, a plurality of different instruction wires can be threaded through the core memory in a desired pattern so that energization of any of these instruction wires writes a corresponding bit pattern, representative of the appropriate internal instruction code, into the memory.

In accordance with a still further aspect of the present invention, the memory is also employed to store variable information which can be written therein from an information register as distinguished from the I level instruction codes which are written therein by energization of the instruction wires. The variable information can comprise multidigit numbers together with signs and exponents or for example, representations of operations, a plurality of which together form a stored program from the user's viewpoint.

In accordance with a still further aspect of the present invention, in addition to the memory already mentioned which will hereinafter be referred to as the main memory, a special memory and a character memory are also provided. All three memories preferably comprise magnetic core memories and communicate with an exchange register (E register) through common sense circuits. The main and special memories also share drive circuitry.

In accordance with a still further aspect of the present invention, the character memory is comprised of a matrix of cores bearing a one to one relationship with a matrix of display points. That is, characters to be displayed by an output device, e.g. a cathode ray tube, are formed by vertically sweeping the tube beam through a matrix comprised of six colunms and eight rows and unblanking the beam at each display point where a "1" bit is stored in the corresponding core in the character memory.

In accordance with a still further aspect of the present invention, the calculator is able to operate in any one of several different modes each of which can be selectively defined by the user. For example, a MANUAL mode can be defined in which the calculator operates by executing operations as they are successively defined by the user actuating keys on the keyboard. In the MANUAL mode, information representing the sequence of key actuations is not stored. On the other hand, in the SAMPLE PROBLEM mode, the calculator similarly executes operations as they are successively defined by the user but in addition stores information representing the sequence of key actuations so that subsequently the calculator can be operated in a RUN mode in which it is able to execute the same sequence of opeartions on newly provided data.

In accordance with a still further aspect of the present invention, output means, e.g. a cathode ray tube, is provided, for selectively displaying the variable information stored in the memory.

The novel features that are considered characteristic of this invention are set forth with particularity in the appended claims. The invention will best be understood from the following description when read in connection with the accompanying drawings, in which:

FIGURE 3 is a map illustrating the organization of the main memory of FIGURE 2;

Figure 1:
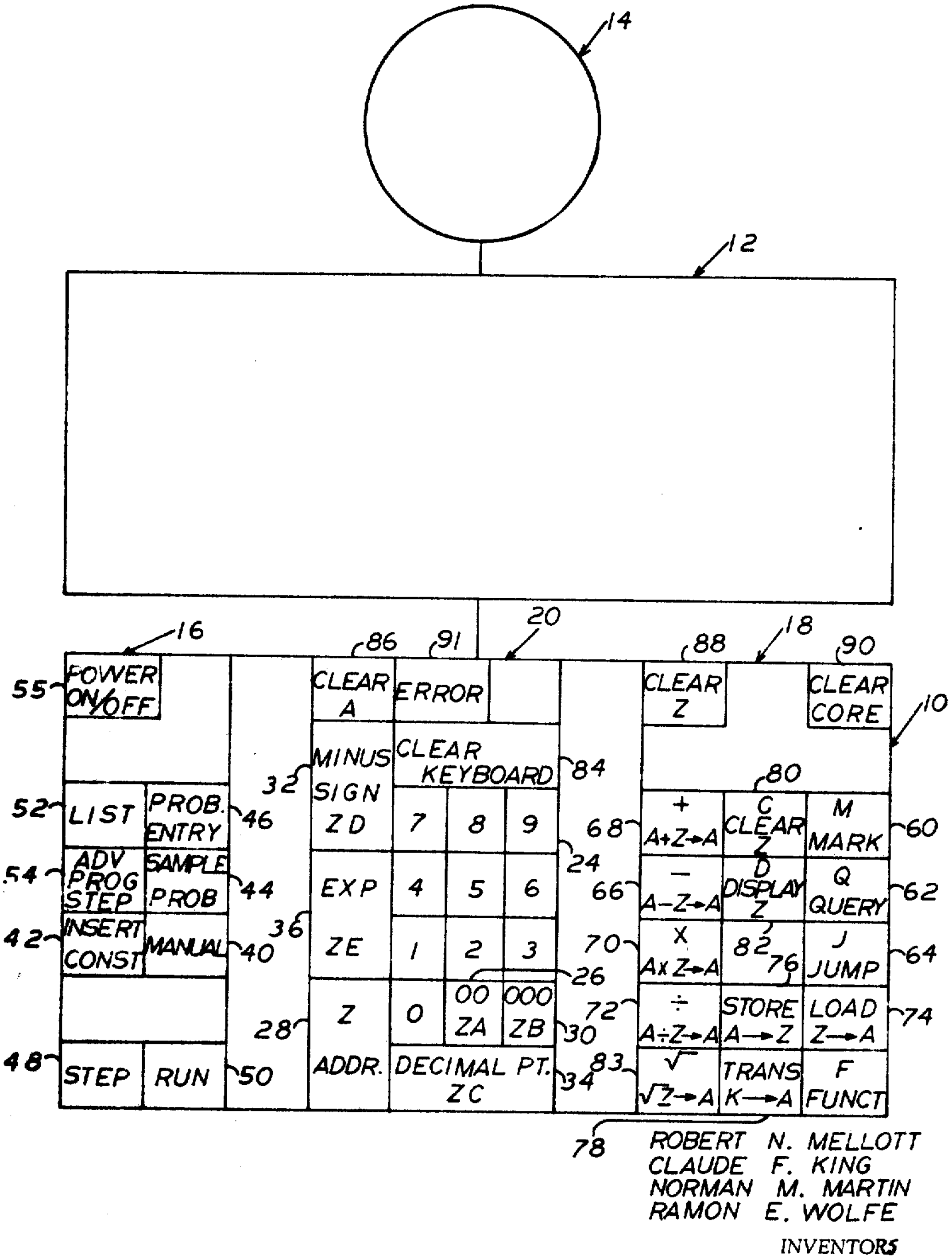
FIGURE 1 is a block diagram of a calculator in accordance with the present invention illustrating in detail an exemplary keyboard thereof.

Attention is now called to FIGURE 1 which comprises a very general block diagram of a calculator constructed in accordance with the present invention. More particularly, the calculator illustrated in FIGURE 1 is comprised of a keyboard 10, a memory and processing apparatus 12, and an output device 14 such as a cathode ray tube. By manipulating the various keys on the keyboard 10, a user is able to store selected information in the memory of apparatus 12 and to cause selected operations, e.g. arithmetic operations, to be performed on such stored information. One such operation that can be performed involves the provision of information to the output device 14 for presentation to the user.

As will become more apparent hereinafter, the calculator depicted in FIGURE 1 can be operated in several different modes which the user can define by selectively actuating the various keys. For example, in a MANUAL mode, operations are executed as they are successively defined by the user actuating the keys. On the other hand, in the RUN mode, for example, a sequence of operations can be executed based on stored information representing a sequence of key actuations.

Prior to considering in detail the various keys on the keyboard 10 and the function performed by the actuation of each, it is pointed out that in accordance with a basic concept of the present invention, the internal operation of the calculator involves the successive execution of a great many elemental operations to perform that which the user may consider as a single operation. For example, the user may command, via the actuation of keys, a simple ADD operation with respect to the contents of two specified memory registers. In order to perform this user level operation, as will be understood better hereinafter, a plurality of internal or I level instruction codes are accessed from the memory in apparatus 12 in an appropriate sequence. In accordance with the preferred embodiment of the invention, the sequence of I level instructions required to perform a user operation, is permanently stored in the memory such that whenever that user operation is commanded by the operator, essentially the same sequence of I level instruction codes is accessed from the memory.

Each I level instruction code in turn defines a different sequence of states (i.e. K states) and during each K state, a different elemental operation is performed in response to a clock pulse. The basic operation of the calculator of course can be equally as well considered from the other direction, i.e. from the elemental operation level to the user level. That is, in response to each clock pulse, a different elemental operation is performed which is dependent upon the K state (i.e. the state defined by a K register) and the I level instruction code (held in the F register) being executed. As each elemental operation is executed in response to a clock pulse, the K state is automatically modified to thereby define the next elemental operation that will occur. After all of the elemental operations required to perform a single I level instruction have been executed, then a subsequent I level instruction code is accessed from the memory and executed. The user level operation is completed only after all of the I level instructions associated therewith have been executed.

In order to better illustrate the operation of the calculator, it is pointed out that about 100 or more I level instructions may be required to execute a typical user level instruction. A sequence of about 50 or more K states may be required to execute a typical I level instruction.

Although the memory structure forming part of apparatus 12 will be considered in detail hereinafter, some preliminary mention of it is appropriate at this point for the purpose of facilitating an explanation of the functions performed in response to the actuation of each of the keys of keyboard 10. The memory preferably comprises a magnetic core structure defining a plurality of word locations. In the exemplary embodiment of the invention disclosed herein, it will be assumed that each word location contains eight binary digit or bit positions. The memory is organized in essentially three sections; namely, a main memory having 256 eight-bit word locations, a special memory having eight eight-bit word locations, and a character memory having six eight-bit word locations. Although the three memories are essentially distinct, they do share various circuits and all do communicate, for either reading or writing, with an exchange (E) register.

Approximately half of the word locations in the main memory are used to store constants and other miscellaneous information and to define registers for storing data. The second half of the main memory is used for the purpose of storing what can be considered a user program, i.e. a sequence of key actuations which the calculator can automatically respond to when it is operated in certain modes, e.g. the RUN mode.

The data registers defined in the first half of the main memory are each comprised of seven successive word locations. Five of these seven word locations are used to store decimal digits in a binary coded decimal format which requires that four bits be used to define each decimal digit. Thus each eight bit word location suffices to define two decimal digits. Accordingly, five word locations in each register are able to define ten decimal digits constituting the mantissa of the quantity stored in that register. The sixth word location in each register is used to define the sign, i.e. plus or minus, of the mantissa stored in the register. The seventh word location in each register is used to define a base ten exponent. The eight bits in the seventh word location of course enable any exponent in the range 0 to 99 to be defined. In accordance with the preferred embodiment of the present invention, the exponent 50 is assumed to comprise a zero exponent with indicated exponents below 50 constituting negative exponents and indicated exponents above 50 constituting positive exponents. In summary, in each of several data registers defined in the first half of the main memory, the absolute value of the mantissa of a number is defined by the initial five word locations in that register. The sixth word location defines the sign of that mantissa and the seventh location defines the base ten exponent of that number.

Now considering the keyboard 10 of FIGURE 1 in more detail, it should be noted that it is comprised generally of a mode keyboard portion 16, an operation keyboard portion 18, a numeric keyboard portion 20, together with a plurality of miscellaneous keys. For brevity, the mode, operation, and numeric keyboards will henceforth be respectively referred to as the M board, O board, and K board. Keyboard entries are to be made in the order of mantissa (decimal digits entered in order of decreasing significance), exponent, Z address, and O board operation.

The K board 20 is used for the purpose of defining numbers and identifying data registers in the first half of the main memory. The K board is comprised of ten (0–9) numeric keys 24 each of which is used by a user to identify a different decimal digit. As will become more apparent, when a user actuates the "5" key on the K board 20, the digit 5 is defined which, depending upon the actuation of other keys, can be interpreted as a decimal digit in either the mantissa or exponent of a number or as an address defining one of the data registers in the first half of the main memory. In addition to the numeric keys 24, a key 26 is provided which is able to define two distinct functions depending upon previously actuated keys. More particularly, key 26 is able to cause two successive "0" digits to be entered simultaneously. When actuated following the actuation of the Z address key 28, it specifies the user level accumulator A which comprises a particular one of the data registers in the first half of the main memory. If any of the numeric keys 24 are actuated after the actuation of the Z address key 28, one of the other data registers (i.e., Z1–Z9) in the main memory will be defined. Key 30 causes three successive "0" digits to be entered simultaneously. When actuated after key 28, it specifies data register ZB in the main memory.

As noted, the key 28, when actuated, indicates that the next key to be actuated will identify a data register in the main memory. If no data register is specifically defined, the calculator interprets this action to represent the K board. Thus, if a number is initially defined by the user on the K board followed by the actuation of one of the keys on the O board 18, then the calculator will perform the designated operation with respect to the number previously entered on the K board. The K board can also be specified by actuating key 28 followed by the actuation of the "0" numeric key 24. Thus, the K board can be considered as data register Z0.

The K board 20 also includes a minus sign key 32. This key will be actuated by the user to define either a negative mantissa or exponent. If the key 32 is actuated after key 28, data register ZD is specified. The key 34 is a decimal point key and is used to place the decimal point to the right of the last digit entered via the keys 24, 26, and 30. If key 34 is not pressed during number entry, the decimal point is assumed to follow the last mantissa digit entered. If key 34 is actuated after key 28, data register ZC is specified. The key 36 comprises an exponent key which indicates the initiation of the entry of an exponent. In response to the actuation of the key 36, the mantissa previously entered into the K board is normalized awaiting entry of an exponent via keys 24. If no entry is made subsequent to the actuation of the exponent key, the position of the decimal point alone determines the exponent. If key 36 is actuated after key 28, data register ZE is specified.

The M board 16 includes a plurality of keys each capable of being actuated to initiate a different operational mode. More particularly, the M board 16 includes a MANUAL key 40. In the MANUAL mode, operations are preformed as they are commanded by actuation of the O board keys. After executing an operation, the calculator will wait until a subsequent operation is identified by the actuation of another O board key.

The INSERT CONSTANT key 42 initiates a mode in which the calculator will execute the next operation called for by the user, as in the MANUAL mode, but after executing this single operation, will return to its previous mode.

A SAMPLE PROBLEM key 44 initiates a mode in which the calculator will both store and execute an operation identified by the actuation of an O board key.

The PROBLEM ENTRY mode is initiated by actuation of key 46. In this mode the calculator will store external operations in the sequence they are identified by actuation of the O board keys. While in this mode, no data can be entered by the user inasmuch as K board entries will all be interpreted as register addresses without the necessity of actuating key 28.

The STEP mode is initiated by actuation of key 48 on the M board 16. In this mode, the calculator will execute the next internal operation stored in the second half of the main memory and then return the calculator to the MANUAL mode. If the next internal operation to be executed requires a keyboard entry, then the calculator will stop during the execution of the operation and await the keyboard entry.

The RUN mode is initiated by actuation of the key 50 of the M board 16. In this mode, the calculator will execute in sequence the operations (i.e. the program) stored in the second half of the main memory until reaching a display operation or an operation requiring a keyboard entry.

The LIST mode is initiated by actuation of key 52 of the M board 16. In this mode, the calculator will display the number of the step in the user's program to the next executed, the stored operation corresponding to that step and several subsequent stored operations. More particularly, in the preferred embodiment of the invention, the second half or approximately one hundred twenty-eight of the word locations in the main memory are used to store a user's program comprised of O board key actuations and data register (Z) addresses. In executing the user's program, as for example in the STEP mode, the user may desire to know through what portion of the program he has progressed. In other words, he may want to know what program step he is up to and the next several program steps or operations to be performed. In addition to displaying the program step and succeeding user instructions, actuation of the LIST key 52 will also display any mark symbols (to be discussed) which are contained in any of the program steps displayed. In the preferred embodiment of the invention, actuation of the LIST key displays the user instruction stored at the displayed program step and the next seven user instructions. Each displayed user instruction is comprised of a Z address and an O board symbol. Subsequent actuation of the LIST key will cause the next group of eight program steps to be displayed.

The ADVANCED PROGRAM STEP mode is initiated by actuation of the key 54. For each actuation of this key, the program step is incremented by one without executing or storing any program steps. After the program step has been incremented, the calculator returns to the previously defined mode. In addition to the foregoing, the keyboard portion 16 includes an on/off power switch 55.

The various keys in the O board 18 will now be considered. In the explanation of the operations initiated in response to the actuation thereof, the letter A is used to represent the previously mentioned user level accumulator which it should be recalled comprises one of the memory data registers. The letter K is used to represent the K board. The letter Z is used to represent one of the other main memory data registers. Z can be identified by the use of key 28 together with one of the other keys previously discussed prior to the actuation of an O board key. "Contents of" is represented by C[ ].

Actuation of the MARK (M) key 60 causes the next program step to be marked with the number designated by Z. In the preferred embodiment of the invention, it is possible to mark each of fourteen program steps with a different mark symbol (i.e. M1–M9 and MA–ME). A program step is marked by actuating key 60 followed by the actuation of a numeric keyboard key. The calculator automatically marks program step 01 with a mark MO.

Actuation of the QUERY (Q) key 62 generates a QUERY operation code which causes the calculator to take the operation code for the next program step from the location marked with the symbolic address specified by Z if the sign of [A] is negative. If [A] is positive, the next operation code in the sequence is next executed. As previously pointed out, the entire user level program comprised of a sequence of operation codes is stored in the second half of the main memory. The term "operation code" will be used to refer to an action occurring at a step of the user level program. As will be seen hereinafter, the term "I level instruction code" will be used to identify an action to occur at a count of the internal or I level program. The user is able to select and change the operation code corresponding to each user level porgram step. On the other hand a wired in I level instruction code is associated with each I level program count and cannot be varied by the user.

The JUMP (J) operation code is generated by actuation of the key 64. The JUMP operation causes the calculator to use as the next operation code, the code stored in the location marked by the symbolic address specified by Z regardless of the sign of [A].

Actuation of the SUBTRACT (−) key 66 generates a SUBTRACT operation code which causes the C[A] minus the C[Z] to be stored in the accumulator.

Actuation of the ADD (+) key 68 generates an ADD operation code which causes the C[A] plus the C[Z] to be stored in A.

Actuation of the MULTIPLY (×) key 70 generates a MULTIPLY operation code which causes the product of C[A] and C[Z] to be stored in A.

Actuation of the DIVIDE (÷) key 72 generates a DIVIDE operation code which causes C[A] to be divided by C[Z] with the quotient being stored in A.

Actuation of the LOAD (L) key 74 generates a LOAD operation code which causes the C[Z] to be stored in A.

Actuation of the STORE (S) key 76 on the other hand generates a STORE operation code which causes the C[A] to be stored in Z.

Actuation of the TRANSFER (T) key 78 generates a TRANSFER operation code which causes the C[K] (i.e. the keyboard) to be transferred to Z.

Actuation of the CLEAR (C) key 80 generates a CLEAR operation code which loads zeroes into Z leaving the A unchanged.

Actuation of the DISPLAY (D) key 82 generates a DISPLAY operation code which causes the C[Z] to be displayed by the cathode ray tube 14.

Actuation of the SQUARE ROOT (√) key 83 generates a SQUARE ROOT operation code which causes the square root of the C[Z] to be obtained and stored in A.

In addition to the M board, O board, and K boards, four manual clear keys 84, 86, 88 and 90 are provided. Actuation of the key 84 clears the K board 20. Actuation of the key 86 clears the user accumulator A. Actuation of the key 88 clears all of the other registers, i.e. the scratch pad registers, also contained within the first half of the main memory and actuation of the key 90 clears the K board and the entire main memory including the accumulator and scratch pad storage registers. An illuminable error key 91 is also provided. In response to certain predefined conditions, e.g. division by zero, the error key will be illuminated. In this event, the error key must be actuated by the user to reset it.

Figure 2:
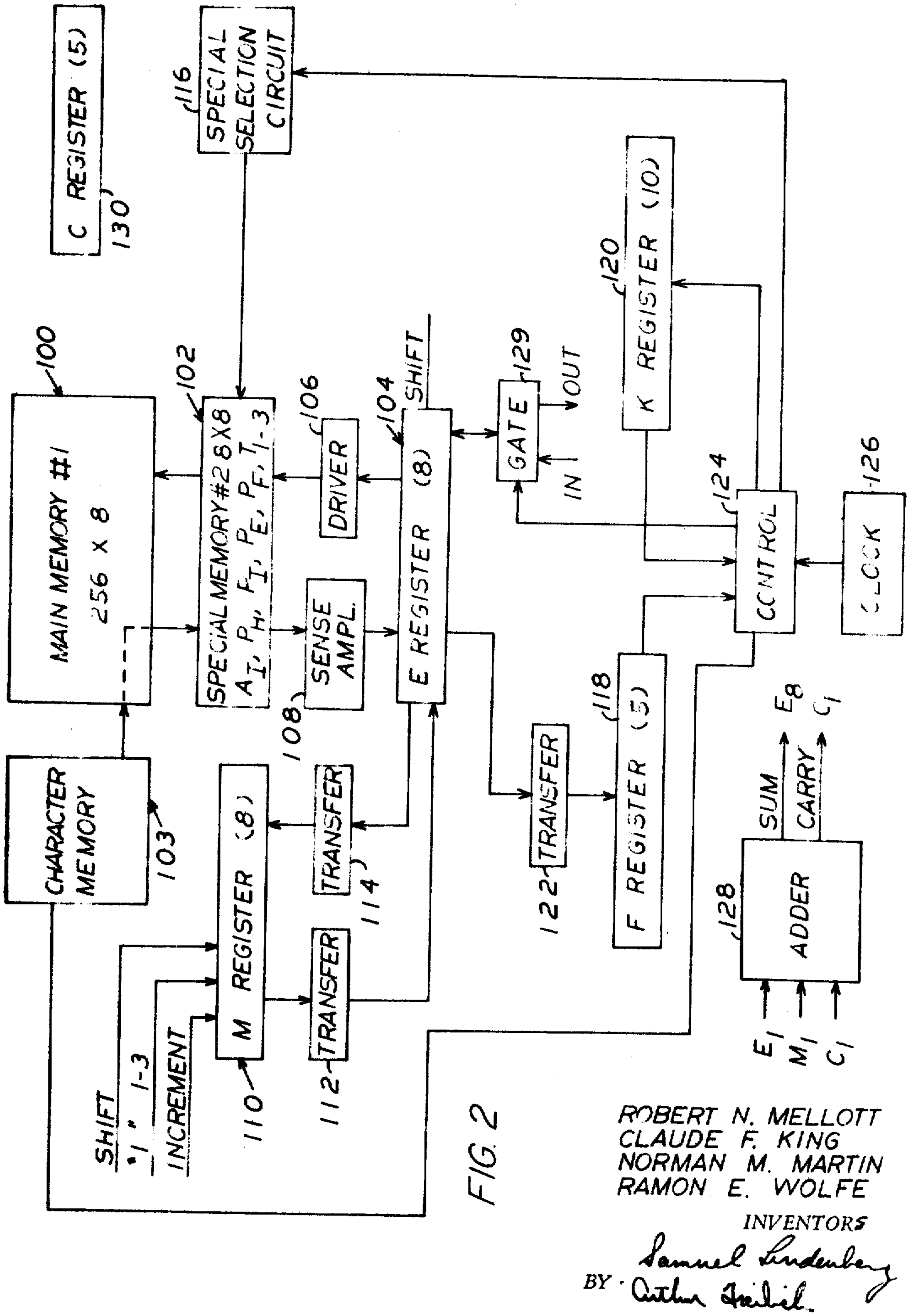
FIGURE 2 is a block diagram of the memory and processing apparatus of FIGURE 1.

Attention is now called to FIGURE 2 which illustrates the organization of the memory and logic apparatus 12 of FIGURE 1. More particularly, the memory and logic apparatus includes a main memory 100 which is assumed to be a magnetic core memory having 256 word locations each comprised of eight bit locations. Preferably, as is conventional in the art, the main memory 100 is comprised of eight bit planes, each bit plane comprising a rectangular matrix of 16 x 16 cores. In addition to the main memory 100, a special memory 102 is provided which contains eight word locations each including eight bit positions. The memory 102 is physically comprised of eight planes each including a core from one of the word locations. The eight word locations of the special memory 102 are used in conjunction with the I level processing to be discussed in greater detail hereinafter. A character memory 103 is also provided and also consists of eight planes, each plane containing six cores. Assuming that the memory 103 is to write any one of thirty-two different characters, thirty-two different character wires are threaded therethrough.

Variable information is written into the main memory 100 and special memory 102 from an eight bit E register 104 through a set of eight inhibit drivers 106. Information from the main memory 100, special memory 102, or character memory 103 is read into the E register 104 through a set of sense amplifiers 108.

An eight bit M register 110 constitutes the selection register for the main memory 100. That is, an eight bit address code stored in the M register 110 defines the word location in the main memory into which information is to be written or from which information is to be accessed. Transfer gates 112 and 114 are provided for enabling eight bit codes to be transferred between the M and E registers.

A seelction circuit 116 is provided for selecting locations in the special memory 102. It is to be noted that although different selection means are provided for the main and special memories, the exchange or E register is common to both of the memories.

It is also pointed out that the M and E registers are external to the main and special memories. That is, whereas, whereas the main memory does contain groups of locations which will, in the course of the present description, be referred to as data registers, the M and E registers are external to the memories and preferably comprise flip-flop registers. In addition to the E and M registers, an F register 118 and a K register 120, also flip-flop registers, are provided. The F register comprises a five bit register and, as will be seen hereinafter, is used primarily for the purpose of storing I level instruction codes which are obtained from the most significant four bit positions of the E register through a transfer gate 122. The K register comprises a ten bit flip-flop register which is controlled by a control device 124 which is responsive to the states of both the F and K registers. The control device 124 operates in response to clock pulses provided from a source 126. As has been previously pointed out, in response to the states of the F and K registers, elemental operations are performed, each elemental operation being performed in response to pulses provided by clock pulse source 126. Thus, for example, the selection circuit 116 is controlled by control device 124 to either write into or read from specified ones of the locations in the special memory.

In addition to the aforedescribed elements in FIGURE 2, other major components include a adder circuit 128. The lowest order stages of the E and M registers, together with flip-flop C1, are connected to the input of adder 128. The sum output of adder 128 is connected to the most significant stage of the E register. The carry output of adder 128 is connected to flip-flop C1. In addition to flip-flop C1, four additional miscellaneous flip-flops C2–C5 are provided. Further input and output lines are coupled to the E register through a transfer gate 129 controlled by control device 124.

Prior to considering the more detailed organization and wiring of the main and special memories 100 and 102, attention is called to FIGURE 3 which illustrates a map of the preferred manner in which information is to be stored in the main memory 100. As previously noted, approximately the first half of the main memory is used to store constants and other miscellaneous information and to define registers for storing data. Actually, in the preferred embodiment of the invention illustrated, the initial 141 locations of the 256 locations in the main memory constitute what has thus far been referred to as the first half of the memory. For convenience, every eighth location in this first memory half is used to store constants and other miscellaneous information. It will be noted these locations are identified as $I_0$–$I_{15}$. The other locations in the first half of the memory are used primarily for data storage. For example, the initial seven locations (i.e. locations 0 through 6) define the internal user level accumulator *Ac*. It will be recalled that the initial five of the seven locations in each memory register are used to store ten significant mantissa digits. The sixth location is used to store the mantissa sign and the seventh location is used to store an exponent. Locations 8 through 14 define data register Z1. Similarly, as shown in FIGURE 3, registers Z2 through Z9 are defined between locations 16 and 80 of the memory with every eighth location being used for miscellaneous purposes.

Locations 80 through 86 define the previously mentioned data register A which constitutes the user's accumulator. Locations 88 through 118 (except for every eighth location therebetween) define data registers ZB, ZC, ZD, ZE. Locations 120–126 define a register C11 which is not available to the user but which, like the user level internal accumulator *Ac* is used in the course of processing. The fourteen locations between locations 128 and 141 are used to define the locations in which marks have been stored by actuation of the O board MARK key previously mentioned. The utility of this key will become more apparent hereinafter.

Locations 144 through 256 are used to store the user program, i.e. the sequence of program steps PS1–PS112 describing O board key actuations and Z addresses which the calculator can automatically respond to when it is operated in certain automatic modes, e.g. the RUN mode.

Typically, the locations $I_0$–$I_{15}$ will normally store information represented by the following Table I:

TABLE I $I_0$—Keyboard stop flag; indicates whether a requested keyboard response has been provided.
$I_1$—Sign flag; used during keyboard entry to indicate whether number being entered is positive or negative.
$I_2$—Program Step; user level.
$I_3$—Old Program Step; user level.
$I_4$
$I_5$
$I_6$
$I_7$—Number entry mode.
$I_8$—Operation code; user level.
$I_9$—Code identifying exponent, Z address, or decimal point flag.
$I_{10}$—Code defining operating mode.
Various Constants:
$I_{11}$—120
$I_{12}$—80
$I_{13}$—6
$I_{14}$—5
$I_{15}$—0

As noted, the special memory 102 is comprised of eight different eight bit locations which will be respectively referred to as $A_I$, $P_H$, $P_I$, $P_E$, $P_F$, $T_1$, $T_2$, and $T_3$. The location $A_I$ is employed as the I level accumulator. Location $A_I$ should not be confused with previously mentioned main memory data registers A or *Ac*. The location $P_H$ is employed to store the most significant or bank portion of the I level program count. The location $P_I$ is used to store the least significant or word location portion of the I level program count. The location $P_E$ is used to save the contents of $P_H$ during the execution of subroutines. The location $P_F$ is used to save the contents of $P_I$ during the execution of subroutines. The temporary registers $T_1$, $T_2$, $T_3$ are used in the course of executing various I level instructions.

Figure 4:
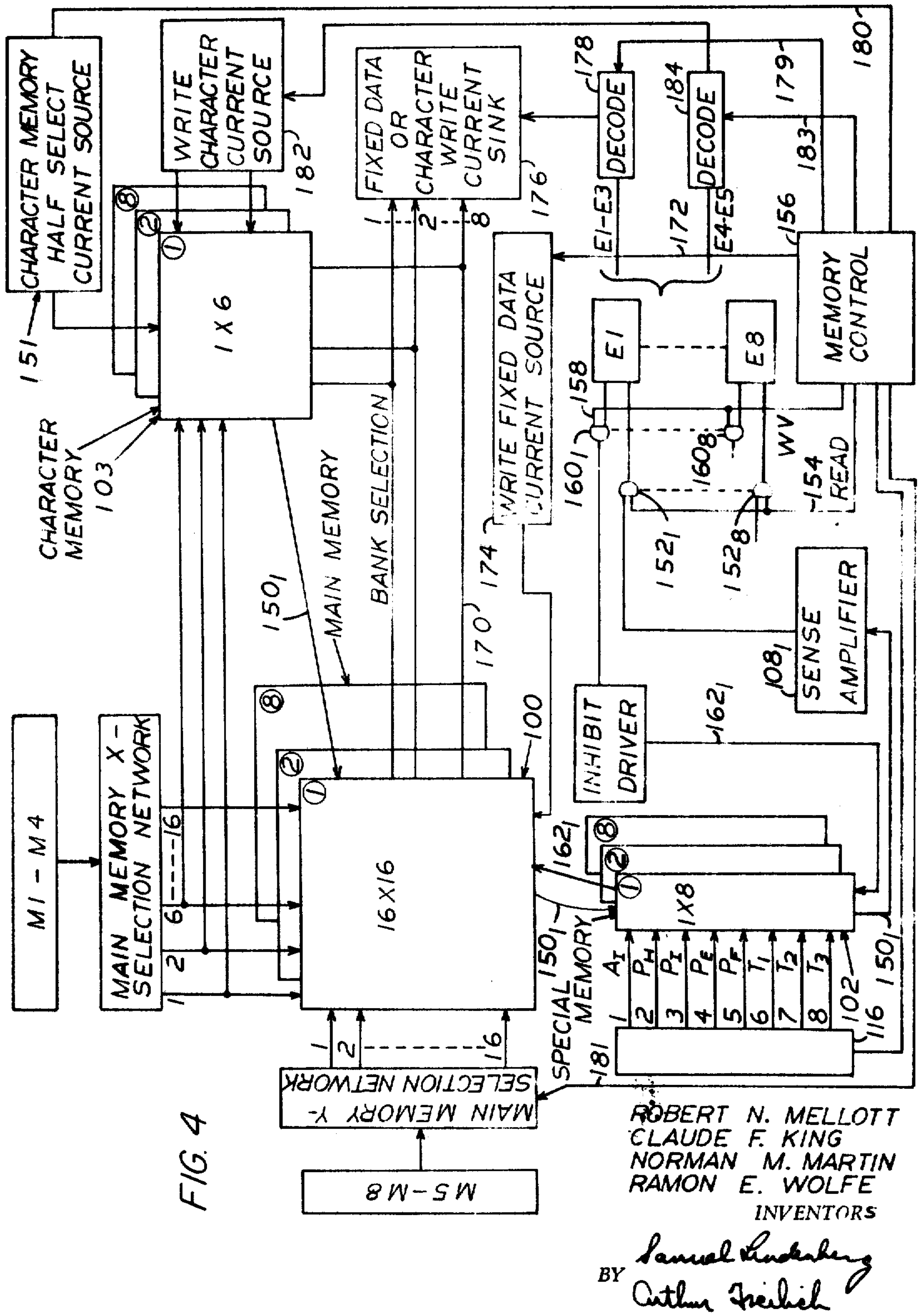
FIGURE 4 is a schematic illustration of the structure of the memories of FIGURE 2.

Attention is now called to FIGURE 4 which illustrates the arrangement of the memories 100 and 102 in greater detail. As noted, the memory 100 is comprised of eight bit planes, each plane including 256 cores arranged in a rectangular matrix of 16 x 16. Bits 1 through 4 of the M register 110 select one of the sixteen positions along the X axis of each plane and bits 5 through 8 of the M register select one of the sixteen positions along the Y axis of each plane.

The special memory 102 is also comprised of eight bit planes, each plane including a corresponding bit core in each of the eight special memory word locations.

FIGURE 4 illustrates the connections between a single bit plane in each of the memories 100, 102 and 103 and the sense amplifiers 108 and inhibit drivers 106. Although not shown, it should be appreciated that each of the other planes in each of the memories is connected in the same manner as the illustrated plane. More particularly, a single sense line $150_1$ threads all of the cores in the first or most significant plane in the main memory 100, the special memory 102 and the character memory 103. When a core is switched in the first plane of any of the memories, an output pulse is induced on the sense line $150_1$ to thus indicate the state of the core to the sense amplifier 108. A particular core in the first memory plane (and corresponding cores in each of the other memory planes) is selected in the main memory 100 by coincident currents provided by the two halves of the M register 110. Coincident current techniques are very well known in the art, and suffice it to say that when bits 1 through 4 of the M register select position 3 on the X axis and bits 5 through 8 select position 2 on the Y axis, then the coincident effect of the selection currents at the core positioned at the intersection of column 3 and row 2 will be sufficient to switch the core, e.g. to a "0" state. If the core switches, thus providing a pulse on the sense line $150_1$, it is interpreted to means that a "1" was stored. If no pulse appears on the sense line $150_1$, it means that the selected core stores a "0." The special memory 102 in FIGURE 4 is shown as being connected in a word oriented fashion which is well known in the art with selection being controlled by selection circuit 116. Character memory selection is performed in a coincident current fashion wherein the character memory half select current source 151 provides the vertical half select current and bits $M_1$–$M_4$ of the M register provide the horizontal half select current. Although the special memory 102 is illustrated as being a word oriented memory and memories 100 and 103 are illustrated as being of the coincident current type, it should be appreciated that these distinctions are not critical but rather are matters of choice. Regardless of the particular manner in which the memories 100, 102, and 103 are wired, sense amplifier $108_1$ is able to recognize the state of any selected bit in the first plane of either the main, special, or character memories 100, 102, or 103. The output of the sense amplifier $108_1$ is connected to the input of an And gate $152_1$ which is enabled by a read control output line 154 of a memory control means 156. That is, in order to read information from any of the memories, the memory control means 156 enables the gates 152 to thereby cause information read from the memories to be loaded into the appropriate stage of the E register; i.e. the output of gate $152_1$ is loaded into register stage $E_1$, the output of gate $152_2$ is loaded into register stage $E_2$, etc.

In order to write variable information into the locations of either memory 100 or 102, the memory control means 156 provides an enabling signal on the write variable control line 158. Control line 158 enables gate $160_1$ to which is applied the output of the $E_1$ register stage. Similarly, the control line 158 controls gates $160_2$–$160_8$. In order to write variable information into a location of the main memory 100 or special memory 102, selection currents are provided to the cores of the selected location either from the M register 110 to cores in memory 100 or from the selection means 116 to cores in memory 102 tending to switch the selected cores to a "1" state, for example. If the E register indicates that a "0" is to be written in a particular bit position of the selected location, then the gate 160 will provide a pulse to the associated inhibit driver 106. The inhibit driver 106 will in turn couple an inhibit pulse to the inhibit winding 162 (e.g. $162_1$) coupled thereto, thus preventing the associated core in the selected location from switching to a "1" state. A different inhibit winding is provided for each of the eight planes with each winding being threaded through all the cores of corresponding planes in both memories 100 and 102; e.g. inhibit winding $162_1$ is threaded through all the cores of the first planes in both memories 100 and 102. If a "1" is to be written in a particular core of the selected location, then the corresponding E register stage will not enable the gate 160 associated therewith, thereby permitting a "1" to be written.

It has previously been pointed out that the main memory 100, in addition to being used for storing variable information such as was described in conjunction with the memory map of FIGURE 3, is used to store I level programs comprised of a sequence of I level instruction codes to which the logic is responsive. In accordance with a significant aspect of the invention, these I level instruction codes are wired into the memory by selectively threading an arbitrary number (e.g. eight) of additional inhibit lines 170 through the cores of memory 100. More particularly, in the preferred embodiment of the invention, eight levels or banks of I level instruction code storage is provided. That is, eight inhibit lines 170 are threaded through the cores of each of the eight bit planes of memory 100 in a manner to enable predetermined codes to be written therein. In order to write the fixed or wired-in information into the memory 100, the memory control means 156 provides an enabling pulse on its write fixed control line 172. The control line 172 is connected to a current source 174 which provides inhibit current to one of the lines 170 dependent on which one of eight current sink switches 176 is closed. The switches 176 are controlled by a decoding circuit 178 which is responsive to the content of stages $E_1$–$E_3$ of the E register and to a control signal provided by memory control means 156 on line 179. Briefly, in order to read an I level instruction code from a location in memory 100, the variable content of that location is first read and stored in a temporary storage location. Then the desired I level instruction code is written into the main memory location by selecting the location via the M register and utilizing the inhibit line 170 corresponding to the bank defined by stages $E_1$–$E_3$ of the E register. Then, the contents of that location can be accessed in a normal manner.

The location $P_I$ in the special memory 102, as previously noted, stores the least significant portion of the I level program count which defines the location in the main memory 100 from which an I level instruction code is to be read. The location $P_H$ defines the most significant portion of the I level program count which defines a particular one of the eight inhibit lines 170 and thus one of the eight levels or banks of wired-in instruction codes. Thus, in order to read the next I level instruction in an I level program, the contents of location $P_I$ are loaded into the M register and the contents of location $P_H$ are brought into the E register. Thus, by energizing the write fixed data current source 174, "1's" will be written into the bits of the word location selected by the M register except in those bit positions through which the selected inhibit line 170 is threaded. After writing the I level instruction code in this manner, it can be accessed in a normal fashion. It is again pointed out that when the term "program count" is used, a particular place in the I level program is referred to. Since the I level program, i.e. sequence of I level instruction codes is wired into the main memory, a particular program count refers to a particular main memory location and a particular bank or one of the inhibit lines 170. When it is desired to access variable information from that location, an "address," rather than "program count," will be used to identify the location. It should also be recalled that the term "program step" refers to a step in the user program stored in the second half of the main memory and should not be confused with the term "program count."

It has been pointed out that the character memory 103 has information wired therein representing the shape of characters to be displayed by an output device 14. The character memory is comprised of eight planes corresponding to eight rows of a matrix of display points with each plane being comprised of six cores corresponding to six columns of the matrix. Information representing a character is read from the memory 103 into the E register eight bits at a time as the lower four stages $M_1$–$M_4$ of the M register are incremented from zero to five.

More particularly, in order to read information from the memory 103, the memory control means 156 energizes the character memory half select current source 151 via control line 180 to provide one half select current. Stages $M_1$–$M_4$ of the M register provide the other half select current. Information read from the memory 103 of course appears on the sense line 150. During a character read operation, it is necessary to inhibit Y selection currents from M register stages $M_5$–$M_8$ in order to prevent destroying information stored in main memory 100. Y selection currents to the main memory are inhibited by a signal provided by memory control means 156 to control line 181.

In the exemplary embodiment of the invention, the memory 103 has thirty two write wires threaded therethrough, each representing one of thirty two different characters. Information representing a selected character is written into the memory by driving current through the appropriate write wire. The four output lines from the write character current source 182 together with the eight input lines to the current sink switches 176 determine which one of the thirty two write wires is energized. More particularly, information representing a selected character is written into the memory 103 in response to the content of stages $E_1$–$E_5$ identifying one of thirty two characters and in response to write character control signals being provided on control lines 179 and 183 controlling decoding circuits 178 and 184. The outputs of stages $E_1$–$E_3$ are provided to decoding circuit 178 and select one of eight current sink switches 176. The outputs of stages $E_4$ and $E_5$ are provided to decoding circuit 184 and select one of four output lines of current source 182.

As noted, the I level instruction codes are comprised of eight bits each. In a preferred embodiment of the invention, two different types of I level instruction codes are employed, each being comprised of two four bit fields. The high order four bits, i.e. 5–8, define an X field and the low order four bits, i.e. bits 1–4, define a Y field. In the first type of I level instruction, the X field identifies a function referring directly to location $8Y+7$ in the main memory where Y is defined by the Y field. Thus, this type of I level instruction addresses the locations $I_0$–$I_{15}$ previously mentioned for Y fields from 0–15. In order to address other main memory locations, some I level instructions define indirect addressing. More particularly, if the four bit X field defines indirect addressing, then the Y field refers to location $(8Y+7)_v$, or in other words, the main memory location whose address comprises the variable contents of main memory location $8Y+7$. Thus with indirect addressing, the address "80" referring to the first location in the user accumulator A, can be accessed from location $I_{12}$ by specifying a Y field of 12.

In order to more expeditiously perform certain operations, as for example the transfer of all of the decimal digits from one of the data registers to another, certain ones of the I level instructions are equipped with a "repeat" capability. These instructions act on consecutive main memory locations, beginning at an addressed (directly or indirectly) location and continuing through six additional iterations.

In the second type of I level instruction code, the X field is comprised of all "0" bits and the Y field defines the function to be executed.

Although it is recognized that various I level instruction code repertoires can be employed in accordance with the invention, a preferred repertoire is symbolically set forth in the following table after which a word description of each of the I level instruction codes is provided:

TABLE II

| Instruction code bits 8-5 | Instruction code bits 4-1 | Name | Action Occurring |
|---|---|---|---|
| 1111 | Y | (CAD) Clear add direct | $(8Y+7)_v \rightarrow A_I$. |
| 0111 | Y | (CAI) Clear add indirect | $((8Y+7)_v)_v \rightarrow A_I$. |
| 1011 | Y | (CAR) Clear add indirect repeat. | $((8Y+7)_v+i)_v \rightarrow (i)_v$. |
| 0100 | Y | (ADI) Add decimal indirect | $((8Y+7)_v)_v + A_I \rightarrow A_I$. |
| 1000 | Y | (ADR) Add decimal indirect repeat. | $((8Y+7)_v+i)_v + (i)_v \rightarrow (i)_v$. |
| 0101 | Y | (SUI) Subtract decimal indirect. | $A_I - ((8Y+7)_v)_v \rightarrow A_I$. |
| 1001 | Y | (SUR) Subtract decimal indirect repeat | $(i)_v - ((8Y+7)_v+i)_v \rightarrow (i)_v$. |
| 1110 | Y | (STD) Store direct | $A_I \rightarrow (8Y+7)_v$. |
| 0110 | Y | (STI) Store indirect | $A_I \rightarrow ((8Y+7)_v)_v$. |
| 1010 | Y | (STR) Store indirect repeat. | $(i)_v \rightarrow ((8Y+7)_v+i)_v$ repeat for $i=0,1, \ldots 6$. |
| 1100 | Y | (BAD) Binary add direct | $(8Y+7)_v + A_I \rightarrow A_I$. |
| 0010 | Y | (CID) Clear increment direct. | $(8Y+7)_v + 1 \rightarrow A_I$. |
| 1101 | Y | (BSD) Binary subtract direct. | $A_I - (8Y+7)_v \rightarrow A_I$. |
| 0000 | 0001 | (CAK) Clear add constant | $(P_I) \rightarrow A_I$ and $P_I+1 \rightarrow P_I$. |
| 0000 | 1000 | (SRD) Shift $A_I$ right decimal. | $A_I$ right shifted 4 bits, zeroes shifted in high order. |
| 0000 | 1001 | (SLD) Shift $A_I$ left decimal | $A_I$ left shifted 4 bits, zeroes shifted in low order. |
| 0000 | 1100 | (SRB) Shift $A_I$ right binary. | $A_I$ right shifted 1 bit, zero shifted in high order. |
| 0000 | 1101 | (SLB) Shift $A_I$ left binary | $A_I$ left shifts 1 bit, zero shifted in low order. |
| 0000 | 1010 | (SRR) Shift Ac right repeat. | Ac mantissa right shifted 4 bits, do not disturb high order digit. |
| 0000 | 1011 | (SLR) Shift Ac left repeat | Ac mantissa left shifted 4 bits, zeroes shifted in low order. |
| 0000 | 0000 | (TFB) Test $A_I$ and Branch. | $A_I$ low order 4 bits $+P_I \rightarrow P_I$. $P_H$ remains constant. |
| 0000 | 0010 | (INP) Input | $0 \rightarrow P_E$, E reg. code $\rightarrow P_F$ and M reg. code $\rightarrow A_I$ |
| 0000 | 0101 | (SEA) Save exit address | $(P_I+1) \rightarrow P_E$ and $(P_I+2) \rightarrow P_F$. |
| 0000 | 0100 | (BPE) Branch on $P_E$ | $P_E \rightarrow P_H$ and $P_F \rightarrow P_I$. |
| 0000 | 1111 | (KLT) Keyboard light control. | $A_I \rightarrow$ E register with E register bits controlling indicator lights and line display position. |
| 0000 | 0011 | (DAD) Dispaly $A_I$ data | $A_I$ bits 1-5 is the code of the character dislayed. |
| 0000 | 0111 | (EXI) External input | Input information into $A_I$. |
| 0000 | 0110 | (OUT) Output | Output information from $A_I$. |
| 0011 | Y | (DIR) Display indirect repeat. | Display main memory data register addressed indirectly by Y. |
| 0001 | Y | (CSK) Conditional skip | If the test condition defined by Y is met, $P_I+1 \rightarrow P_I$ and $P_H$ is unchanged; if not met, $(P_I) \rightarrow P_I$ and $P_H$ is unchanged. |

| CSK Instruction Test Conditions | Condition Tested |
|---|---|
| ZEI | $A_I=0$. |
| NZI | $A_I \neq 0$. |
| OVF | Overflow on previous instruction. |
| NOV | No such overflow. |
| NKA | C4, keyboard flip-flop is set. Reset horizontal display sweep. |
| NSR | C4, keyboard flip-flop is set. |
| MAN | Manual button on the keyboard is depressed. |
| UNC | Unconditional skip. |
| $NEV_0$ | Never skip $(P_I) \rightarrow P_I$ and $0 \rightarrow P_H$. |
| $NEV_1$ | Never skip $(P_I) \rightarrow P_I$ and $1 \rightarrow P_H$. |
| $NEV_2$ | Never skip $(P_I) \rightarrow P_I$ and $2 \rightarrow P_H$. |
| $NEV_3$ | Never skip $(P_I) \rightarrow P_I$ and $3 \rightarrow P_H$. |
| $NEV_4$ | Never skip $(P_I) \rightarrow P_I$ and $4 \rightarrow P_H$. |
| $NEV_5$ | Never skip $(P_I) \rightarrow P_I$ and $5 \rightarrow P_H$. |
| $NEV_6$ | Never skip $(P_I) \rightarrow P_I$ and $6 \rightarrow P_H$. |
| $NEV_7$ | Never skip $(P_I) \rightarrow P_I$ and $7 \rightarrow P_H$. |

In response to the CAD instruction code, the variable content of location $8Y+7$ is accessed and stored in special location $A_I$. In response to the CAI instruction, the variable content of location $8Y+7$ is used as an address to identify another location whose content in then stored in special location $A_I$. In response to the CAR instruction, the variable content of location $8Y+7$ is used as an initial direct address to identify another location whose content is then stored as the variable content of location 0. The initial direct address is then successively incremented by one through seven iterations to thus enable to contents of seven successive main memory locations, e.g. one of the data registers, to be transferred to successive locations of data register $Ac$. In this and all other indirectly addressed REPEAT instructions, the indirect addressing is used only to access an initial direct address. Thereafter, the accessed direct address is successively incremented.

In response to the ADI instruction, the variable content of location $8Y+7$ is used as an address to identify another location whose content is added to the content of special location $A_I$ with the sum being stored in location $A_I$. This is a decimal addition and contemplates an 8421 binary coded decimal (BCD) code. In response to the ADR instruction, the variable content of location $8Y+7+i$ (where initially $i=0$) is accessed and used as an initial direct address to identify a location whose content is then added (decimal addition) to the variable content of location $i$ with the sum being stored in location $i$. The direct address $8Y+7+i$ is thereafter incremented by one through a total of six iterations (i.e. from $i=0$ to $i=5$) thus permitting, e.g. the contents of any data register to be added to the contents of $Ac$ with the sum being stored in $Ac$.

In response to the SUI instruction, the variable content of location $8Y+7$ is used as an address to identify a location whose content is then subtracted from the content of location $A_I$ with the difference being stored in $A_I$. This is a decimal subtraction. In response to the SUR instruction, the variable content of the location $8Y+7+i$ is used as an address to identify a location whose content is then subtracted from the variable content of location $i$ with the difference being stored in location $i$. This is also a decimal subtraction and $i$ is incremented from 0 through 5.

In response to the STD instruction, the content of special location $A_I$ is stored as the variable content in location $8Y+7$. In response to the instruction STI, the content of special location $A_I$ is stored in the location identified by an address comprising the variable contents of location $8Y+7$. In response to the STR instruction, the variable content of location $i$ is stored in the location identified by an address stored in location $8Y+7+i$. This instruction is repeated for $i$ values from 0 through 5 and thus also permits the transfer of entire number to one of the data registers in main memory.

In response to the BAD instruction, the variable content of location $8Y+7$ is added to the content of special location $A_I$ with the sum being stored in location $A_I$. This is a binary addition. In response to the CID instruction, one is added to the variable content of location $8Y+7$ with the sum being stored in special location $A_I$. This also is a binary addition. In response to the BSD instruction, a binary subtraction is performed which involves subtracting the variable content of location $8Y+7$ from the content of special location $A_I$ with the difference being stored in location $A_I$.

All of the I level instruction codes thus far considered have been comprised of a four bit function field and a four bit Y field. The I level instruction codes to be considered immediately hereinafter do not use the Y field but are comprised of function fields using eight bits. Prior to considering these instruction codes, it might be germane to recall that special locations $P_I$ and $P_H$ are used to define the I level program count, i.e. $P_I$ defines one of 256 main memory locations and special location $P_H$ defines one of the eight wired-in memory banks. For example, in response to the CAK instruction code, the wired-in content of the location following the CAK instruction code is accessed and inserted into the special location $A_I$. The content of special location $P_I$ is then incremented. The content of special location $P_H$ defining one of the wired-in memory banks remains constant.

In response to the SRD instruction, the bits of special location $A_I$ are shifted to the right four bit positions with "0" bits being shifted into the high order four bit positions of location $A_I$. In response to the SLD instruction, the bits of special location $A_I$ are shifted left four bit positions with "0" bits being shifted into the low order four bits of $A_I$. Whereas the SRD and SLD shift instructions can be considered decimal shifts in that the bits of location $A_I$ are shifted four bit positions at a time, the shift instructions SRB and SLB comprises binary shifts in that instruction SRB causes the content of location $A_I$ to be shifted right one bit position with a "0" bit being shifted in the high order bit position and instruction SLB causes the content of location $A_I$ to be shifted left one bit position with a "0" bit being shifted into the low order bit position.

The instruction SRR shifts the bits of the initial six words of main memory register *Ac* right four bit positions. The most significant decimal digit in the sign word is held in addition to being shifted right. Utilization of eleven SRR instructions enables the register *Ac* to be completely filled with whatever code was initially stored in the most significant half of the *Ac* register sign word. This operation of course effectively divides the mantissa by ten. The SLR instruction shifts the mantissa of main memory register *Ac* left four bit positions, shifting "0" bits into the low order four bit positions of *Ac*. This effectively multiplies the mantissa by ten.

In response to the TFB instruction, the low order four bits special location $A_I$ are added to the content of special location $P_I$ with the sum being stored in location $P_I$. This instruction therefore permits a sixteen way branch from any I level program count. $P_H$ remains constant.

In response to the INP instruction, the special location $P_E$ is cleared, and the contents of the E and M registers are respectively stored in the special locations $P_F$ and $A_I$. In response to the SEA instruction, the contents of the two locations following the location storing the SEA instruction are respectively transferred to special locations $P_E$ and $P_F$. Similarly, in response to the BPE instruction, the contents of the special locations $P_E$ and $P_F$ are respectively transferred to special locations $P_H$ and $P_I$. In response to the KLT instruction, the eight bits of special location $A_I$ are transferred to the E register with the E register bits being used to control various keyboard indicator lights or to initiate the horizontal beam sweep along a line designated by the E register bits. In response to the DAD instruction, the low order five bits of special location $A_I$ are interpreted as the code of a character to be displayed. The EXI instruction provides for input information appearing on the input lines of FIGURE 2 to be written into special location $A_I$. The OUT instruction on the other hand causes the information stored in special location $A_I$ to appear on the output lines of FIGURE 2.

The DIR instruction requires a four bit Y field and causes the main memory data register indirectly addressed by the Y field to be displayed.

The CSK instruction uses a four bit X field to define the instruction and a four bit Y field to define a test condition. Thus, the CSK instruction is capable of initiating or testing sixteen different actions. All CSK instructions (except where test condition is specified as UNC) are followed by a wired-in constant which is accessed and forced into location $P_I$ as part of the next program count if the specified test is not successful. If the test is successful, the wired-in word after the CSK instruction is skipped. When test condition UNC is specified, the wired-in constant is not employed and the following wired-in instruction is always skipped. When one of the NEV test conditions is specified, the wired-in constant is always forced into location $P_I$ and used as part of the new program count.

If the Y field stores a ZEI code, then the content of location $A_I$ is tested. If the content of location $A_I$ equals zero, then the content of location $P_I$ is incremented by one to skip the wired-in constant. Thus, no branching occurs and the next I level program count is taken in sequence. If on the other hand the content of $A_I$ does not equal "0," then the test condition is not met and the wired-in constant is forced into special location $P_I$ and is used as part of the next program count. Regardless of whether or not the test condition is met, the content of $P_H$ remains unchanged. If the Y field of the CSK instruction is comprised of an NZI code, then special location $A_I$ is tested to determine whether it does not store a "0." That is, if the content of $A_I$ is not equal to "0," then the test condition is met and the following wired-in constant is skipped. If $A_I$ is equal to "0," then the test condition is not met and the following wired-in constant is used as the next program count. When the Y field defines an OVF code, the condition is met if an overflow had occurred on the previous I level instruction. If on the other hand the Y field stores an NOV code, then the condition is met if no overflow had been developed in response to the previous instruction. The NKA and NSR Y fields determine whether stage 4 of the C register, that is the keyboard flip-flop is set or reset. If the Y field defines an MAN code, then the keyboard is tested to determine whether the MANUAL button is depressed.

In addition to the foregoing, the four bit Y field associated with the CSK instruction can define eight additional codes $NEV_0$–$NEV_7$. These codes are used to permit the program count, that is the contents of locations $P_I$ and $P_H$ to be forced to any of the fixed wired words in the main memory. For example, in response to code $NEV_0$, the content of location $P_I$ is used as an address to access a new program count which is inserted into location $P_I$. A "0" is inserted into location $P_H$. Similarly, with each of the other NEV codes, the content of special location $P_I$ is used to access a wired-in word from the main memory location identified thereby. Each of the NEV instructions forces thes content of location $P_H$ to a different number defining a different wired-in memory bank. That is, codes $NEV_0$–$NEV_7$ respectively force location $P_H$ to define banks 0 through 7.

As previously noted, the execution of each I level instruction requires that a unique sequence of K states be defined. Each K state is defined in response to a different clock pulse provided by source 126. During each K state, a different elemental operation is executed. An elemental operation, for example, comprises a memory operation, i.e. reading from or writing into the main or special memories, or a modification or transfer of the contents of one of the flip-flop registers.

Prior to considering in detail the K state sequences associated with each of several typical I level instructions, it is ponted out that a GENERAL K state sequence is always executed between the execution of any two successive I level instructions. More particularly, as will be better understood hereinafter, each I level instruction K state sequence automatically terminates in the initial K state of the GENERAL sequence. The GENERAL sequence is then executed in order to access the next I level instruction code to be executed from the main memory. Briefly, it will be recalled that in order to access an I level instruction code from a particular main memory location, it is first necessary to read the variable content of that location, temporarily store it, write the wired-in I level instruction code in the main memory location, read that I level instruction code, and then return the temporarily stored variable content to the main memory location. These steps are all performed by the GENERAL sequence which leaves the newly accessed I level instruction code in the F register ready to be executed.

Tables IV, V and VI which are set forth hereinafter, respectively describe the GENERAL, CAD, and CAR K state sequences. For the sake of brevity, the K state sequences for the other I level instruction codes are merely set forth in Appendix A hereof. Their general characteristics should be discernible from what is to be said about the GENERAL, CAD, and CAR sequences.

TABLE III

| | |
|---|---|
| **K7, K6** | |
| 01 | During write normal, write wired-in data |
| **K5** | |
| 0 | No memory operation |
| 1 | Memory operation |
| **K4, K3, K2** | |
| 000 | $P_I$ |
| 001 | $P_H$ |
| 010 | $T_3$ |
| 011 | $A_I$ |
| 100 | $T_1$ |
| 101 | $T_2$ |
| 110 | $P_F$ |
| 111 | $P_E$ |
| **K1** | |
| 0 | Normal |
| 1 | Special |
| **K0** | |
| 0 | Read |
| 1 | Write |

Table III illustrates the significance of the states of the eight K register flip-flops K0–K7 in defining elemental operations to be performed. Where K state numbers such as 20003 are used (e.g. in Table IV), it will be understood that flip-flops K0 and K1 define the least significant decimal digit (i.e. "3"), flip-flops K2–K4 define the next more significant digit (i.e. "0"), flip-flop K5 defines the middle digit (i.e. "0,"), flip-flops K6 and K7 define the next to most significant digit and flip-flops K8 and K9 define the most significant digit (i.e. "2"). Note that flip-flops K0 and K1 together identify one of four possible memory operations, namely read normal (i.e. read the content of an addressed main memory location), read special (i.e. read the content of one of the eight special locations identified by flip-flops K2–K4), write normal (i.e. write information into the addressed main memory locations), and write special (i.e. write information into one of the special locations identified by flip-flops K2–K4). Flip-flops K2–K4, as noted, identify a particular one of the eight special locations. Flip-flops K5, if a "1," indicates a memory operation, as identified by flip-flops K0 and K1, is to be performed. If flip-flop K5 stores a "0," no memory operation is to be performed. When flip-flop K7 stores a "0," and flip-flop K6 stores a "1," this indicates that a wired-in I level instruction code is to be written when a

TABLE IV

| K Seq | K Sub Seq | E | M | C1 | C2 | C3 | Memory | Comments |
|---|---|---|---|---|---|---|---|---|
| 20 | 003 | X | X | X | C1 | 0 | | $0 \rightarrow F_{1-5}$. |
| 20 | 102 | $P_I$ | 0 | 1 | | | RS $P_I$ | Read $P_I$. |
| 00 | 000 | | | | | | | |
| 00 | 001 | ↑ | | | | | | |
| 00 | 003 | | | | | | | |
| 00 | 002 | | | | | | | |
| 00 | 010 | BINARY ADD | | | | | | |
| 00 | 011 | | | | | | | |
| 00 | 013 | ↓ | | | | | | |
| 00 | 012 | | | | | | | |
| 21 | 103 | X | E | | | | WS $P_I$ | Store $P_I+1$. |
| 21 | 152 | $T_2$ | H | | | | RS $T_2$ | Clear $T_2$. |
| 21 | 150 | (M) | \| | | | | RN | Read Mem. at Addr. $P_I+1$. |
| 21 | 153 | X | \| | | | | WS $T_2$ | Save (M). |
| 21 | 112 | $P_H$ | \| | | | | RS $P_H$ | Read bank #. |
| 21 | 113 | | \| | | | | WS $P_H$ | Write bank #. |
| 21 | 012 | | ↓ | | | | | |
| 21 | 141 | X | | | | | WI | Write fixed data, inst. |
| 21 | 142 | $T_1$ | | | | | RS $T_1$ | Clear $T_1$. |
| 33 | 140 | (M) | | | | | RN | Read inst. written above. |
| 33 | 143 | | | | | | WS $T_1$ | Put inst. in temp. |
| 33 | 152 | $T_2$ | | | | | RS $T_2$ | Get (M) from temp. |
| 33 | 141 | | | | | | WN | Put (M) back. |
| 33 | 142 | $T_1$ | | | | | RS $T_1$ | Get inst. from temp. |
| 20 | 050 | $E_{1-4} \rightarrow E_{5-8}$ | $E_{1-4} \rightarrow M_{4-7}$ $1 \rightarrow M_{1-3}$ $0 \rightarrow M_8$ | | | | | $E_{5-8} \rightarrow {}_{1-4}$ with $F_{5-0}$. |
| 20 | 051 | $0 \rightarrow M$ Spec | | | | | | $E_{5-8} \rightarrow F_{1-4}$ & $1 \rightarrow F_5$. |

write normal operation is defined by flip-flops K0 and K1. In this event, the bank number of the wired-in instruction is to be found in the low order three stages of the E register.

Attention is now called to Table IV, above, which describes the GENERAL K state sequence.

In the initial K state (20003) the F register is cleared. The contents of the E and M registers are not significant in this state. The state of flip-flop C1 which stores a carry or overflow from a previous I level instruction is transferred to flip-flop C2. The next K state 20102 defines a read special operation in which the content of special location $P_I$ is accessed and entered into the E register. More particularly, from Table III, it should be apparent that the "1" stored in flip-flop K5 indicates that a memory operation is to be performed. The "0" presented by flip-flops K2–K4 identifies special location $P_I$ and the "2" presented by flip-flops K0 and K1 defines a read special operation. The content of special location $P_I$ of course represents the low order portion of the I level program count. During this K state, a "1" is forced into flip-flop C1 and the M register is forced to "0."

During the next eight K states, i.e. from 00000 to 00012, a binary add operation is performed. It will be recalled that the first stages of the E and M registers together with flip-flop C1 are connected to the input of the adder 128 (FIGURE 2) with the sum terminal of the adder being connected to the most significant stage of the E register. During each of the eight K states required for the binary add operation, the E and M registers are shifted right one bit. As a consequence, at the end of K state 00012, the E register will store the next program count, i.e. $P_I+1$.

During the next K state (21103), the content of the E register is written into special location $P_I$. It should be readily discernible that the content of flip-flops K0–K5 define a write special memory operation causing the content of the E register to be stored in special location $P_I$. More particularly, flip-flop K5 stores a "1" defining a memory operation, flip-flops K2–K4 define a "0" identifying special location $P_I$, and flip-flops K0 and K1 identify a write special operation. In addition, the content of the E register is transferred to the M register during state 21103. During the succeeding state (21152), a read special memory operation is defined directed toward special location $T_2$. This operation effectively clears special location $T_2$. During the succeeding K state (21150), a read normal operation is executed which accesses the variable content from the main memory location whose address is $P_I+1$. It will be recalled that the quantity $P_I+1$ is contained in the M register. During the succeeding K state (21153), a write special operation is defined which stores the variable content accessed from main memory location $P_I+1$ in special location $T_2$. During the succeeding K state (21112), a read special operation is executed which reads special location $P_H$ to thereby bring the bank number portion of the program count into the E register. During the succeeding K state (21113), the bank number $P_H$ is written back into special location $P_H$. The next succeeding K state (21012) is a do nothing state.

During the next K state (21141), a "write wired-in word" operation is defined which writes one of the wired-in words into the location identified by the contents of the M register, i.e. $P_I+1$. The wired-in word which will be written of course is determined by the bank number or initial three bits of $P_H$ stored in the E register. During the succeeding K state (21142), a read special operation is defined which clears special location $T_1$. During the next K state (33140), a read normal operation is defined which accesses the content of the main memory location identified by the address in the M register which comprises the next I level instruction code to be executed. During the next K state (33143), the content of the E register, i.e. the next I level instruction code to be executed, is stored in special location $T_1$. During the succeeding K state (33152), a read special operation is defined which brings back into the E register the variable content of memory location $P_I+1$ previously stored there during K state 21153. During the next K state (33141), a write normal operation is defined which writes the variable content of main memory location $P_I+1$ back into that location. During the next K state (33142), a read special operation is defined which gets the next I level instruction from special location $T_1$ and brings it into the E register.

At this time, it is well to recall that each I level instruction code is comprised of eight bits. Some of the I level instruction codes, as previously described consist of a high order four bit function field and a low order four bit Y field. The other I level instructions are also comprised of eight bits of which the high order four bits are all zeroes and the low order four bits define the function as indicated in Table II.

During K state 20050, the low order four bits of the I level instruction code are transferred both to the high order four bit positions of the E register and to bit positions 4–7 of the M register. In addition, "1's" are forced into bit position 1–3 of the M register and a "0" is forced into bit position 8 of the M register. As a consequence of these manipulations, if the low order four bits of the instruction code constituted a Y field, then the M register would now store the quantity $(8Y+7)$. In addition to the foregoing, the high order four bits of the I level instruction code are transferred to the low order four bits of the F register with bit 5 of the F register remaining "0." Thus, if the I level instruction code being processed is one that contains a non-zero function field, then the four bit function field will be in the F register and the address $(8Y+7)$ will be in the M register at the end of state 20050. Since the F register will thus no longer define an all zeroes code specifying the GENERAL K state sequence, the K state sequence defined by the function field in the F register will thereafter be executed.

On the other hand, assume that the accessed I level instruction code was one that contained an X field comprised of all "0's." Then, at the end of state 20050, the F register will still store in all "0's" code. The low order four bits of such I level instruction codes would after state 20050, be stored in the high order four bit positions of the E register. Consequently, during state 20051, bits 5 through 8 of the E register are transferred into bits 1 through 4 of the F register to thus specify the I level instruction code to be executed. In addition, a "1" is forced into bit position 5 of the F register and the M register is cleared since its content will not be meaningful.

From the description of the GENERAL K state sequence, it should be appreciated that depending upon the next I level instruction to be executed, the GENERAL K state sequence will terminate in either K state 20050 or 20051.

Let it be assumed that at the end of state 20050, the F register stored the function field of the previously described CAD I level instruction code. The K state sequence responsive to this code is set forth in Table V. It will be recalled that in response to the CAD I level instruction, the variable content of an addressed main memory location is accussed and stored in special location $A_I$. It will further be recalled that the address of the main memory loction to be accessed is at this time stored in the M register as a consequence of the manipulation of the M register bits during state 20050 during the GENERAL K state sequence.

Attention is now called to Table V which describes the CAD K state sequence.

TABLE V

| K Seq | K Sub Seq | E | M | C1 | C2 | C3 | Memory | Comments |
|---|---|---|---|---|---|---|---|---|
| 20 | 051 | | | | | | | |
| 20 | 053 | X | ADD. | 0 | | | | |
| 22 | 132 | $A_I$ | H | | | | RS $A_I$ | Clear $A_I$ |
| 22 | 143 | X | \| | | | | WS $T_1$ | Put $A_I$ in temp. |
| 02 | 042 | X | \| | | | | | |
| 02 | 100 | (M) | ↓ | | | | RN | Read (M) |
| 02 | 101 | H | X | | | | WN | Rewrite (M) |
| 01 | 133 | X | \| | | | | WS $A_I$ | (M)→$A_I$ |
| 20 | 003 | ↓ | ↓ | | | | | |

The initial CAD K state can be considered to be 20051 which it will be recalled will not be defined as part of the GENERAL sequence when an I level instruction not having an all "0's" X field is accessed. State 20051 and the following state 20053 are do nothing states. The following K state (22132) defines a read special operation specifying special location $A_I$. As a consequence of this operation, special location $A_I$ is cleared and the content thereof is stored in the E register. During the next state (22143), a write special operation is defined specifying special location $T_1$ which stores the content previously accessed from $A_I$ and now in the E register in special location $T_1$. State 02042 is a do nothing state. The next state 02100 defines a read normal operation which utilizes the address contained in the M register to access the content of a main memory location. During the next state (02101), a write normal operation is defined which rewrites the word accessed in the previous state into the memory. The next state (01133) defines a write special operation designating special location $A_I$. As a consequence of this state, the content of the main memory location identified by the Y field of the I level instruction being executed, is written into special location $A_I$. The CAD K state sequence, like all other I level instruction K state sequences, terminates in the first state of the GENERAL K state sequence.

Attention is now called to Table VI which describes the K state sequence for the CAR I level instruction.

TABLE VI

| K Seq | K Sub Seq | E | M | C1 | C2 | C3 | Memory | Comments |
|---|---|---|---|---|---|---|---|---|
| 20 | 051 | | | | | | | |
| 20 | 053 | X | ADD. | 0 | | | | |
| 20 | 052 | | H | | | | | |
| 10 | 150 | (M) | H | | | | RN | Read indirect address. |
| 10 | 151 | H | | | | | WN | |
| 10 | 153 | | $0 \rightarrow M_{4-8}$ $E_{1-3} \rightarrow M_{1-3}$ | | | | WS $T_2$ | Put indirect address in temp. |
| 31 | 142 | $T_1$ | H | | | | RS $T_1$ | Clear $T_1$. |
| 31 | 140 | (M) | | | | | RN | Clear Ac digits. |
| 31 | 041 | HX | | | | | | |
| 31 | 143 | X | | | | | WS $T_1$ | Put Ac digits in temp. |
| 31 | 152 | $T_2$ | ↓ | | | | RS $T_2$ | Read indirect addr. |
| 31 | 050 | | $E_{4-8} \rightarrow M_{4-8}$ $M_{1-3}$ Hold | | | | | |
| 31 | 051 | M | H | | | | | |
| 31 | 153 | X | | | | | WS $T_2$ | Put indirect addr. in temp. |
| 02 | 042 | | | | | | | |
| 02 | 100 | (M) | | | | | RN | Read digits from indirect addr. |
| 02 | 101 | H | ↓ X | | | | WN | Rewrite digits in indirect addr. |
| 30 | 053 | X | E | | | | | |
| 30 | 152 | $T_2$ | H | | | | RS $T_2$ | Get indirect addr. from temp. |
| 30 | 153 | | | | | | WS $T_2$ | Rewrite indirect addr. |
| 30 | 052 | M | 0 $M_{4-8}$ $E_{1-3} \rightarrow M_{1-3}$ | | | | | Make M=Ac addr. |
| 30 | 000 | H | ↓ | | | | | |
| 30 | 101 | X | | | | | WN | Write indirect addr. digits in Ac. Test: If M=6 K=20003. |
| 30 | 003 | | M+1→M | | | | | If K=30003 go to return. |

It will be recalled that the CAR instruction uses the quantity $8Y+7$ as an indirect address to access an initial direct address. The direct address is then incremented through seven interations in order to enable the contents of seven successive main memory locations, e.g. one of the main memory data registers, to be transferred to *Ac* in the main memory.

As a consequence of the GENERAL K state sequence, the address $8Y+7$ is stored in the M register prior to state 20053. The next state (20052) is a do nothing state. During the next state (10150), a read normal operation is defined which reads the initial direct address from the main memory location specified by the content of the M register. For example, if the content $(8Y+7)$ of the M register specified location $I_{12}$ of the main memory, then the direct address 80 (assuming the memory map of FIGURE 3) would appear in the E register upon the completion of K state 10150. The next state (10151) defines a write normal operation which writes the content (i.e., 80) of the E register back into the memory. The next state (10153) defines a write special operation specifying location $T_2$. The content of the E register is therefore written into special location $T_2$. In addition, the low order three bits of the E reigster are transferred to the low order three bits of the M register while the high order five bits of the M register are cleared. Thus, assuming that the constant 80 is stored in the E register, then an all "0's" address would now be stored in the M register specifying main memory location 0. It should therefore be apparent that K states 10150 through 10153 load the direct starting address into special register $T_2$ and thus enable the correct *Ac* register word to be cleared prior to later wrting new information into it (K state 30101).

The foregoing K states are defined only when the CAR instruction is initiated. The remaining K states define a subsequence representing a loop through which the system will sequence, incrementing *i* for each iteration through the loop. The first state of this loop (31142) defines a read special operation which clears special location $T_1$. The next state (31140) defines a read normal location in the accumulator (*Ac*) specified by the M register. The next state (31041) is a do nothing state. The next state (31143) defines a write special operation which stores the word read from the accumulator (*Ac*) during state (31140) in special location $T_1$. During the following state (31152), the direct address (e.g. 80) previously stored in special location $T_2$ is read. During the next state (31050), the high order five bits of the E register is transferred to the high order five bits of the M register. The low order three bits of the M register are not modified. Thus, the M register at this time defines the main memory location from which the next word is to be read. During the next state (31051), the content of the M register is transferred to the E register.

During the following state (31153), a write special operation is defined which puts the address (e.g. 80) stored in the E register into special location $T_2$. The next state (02042) is a do nothing state. During the following state (02100), a read normal operation is defined which reads the content of the indirectly addressed location into the E register. This is the information it is desired to transfer into the *Ac* accumulator. During the next state (02101), a write normal operation is defined which writes the content of the E register back into the main memory location (e.g. 80) from which it was read. During the following state (30053), the content of the E register is transferred to the M register. During the next state (30152), a read special operation is defined which accesses the previously stored address from special location $T_2$ and during the next state (30153), that address is rewritten into special location $T_2$.

It will be recalled that during state (30053), the information to be transferred to the accumulator (*Ac*) was transferred from the E to the M register. During state (30052), this information is transferred back to the E register. Simultaneously, the low order three bits of the E register are transferred into the low order three bits of the M register while the high order five bits of the M register are forced to zero. Thus the M register will define the main memory location in the accumulator (Ac) into which the information now stored in the F register is to be written. The next state (30000) is a do nothing state. The next state (30101) defines a write normal operation which writes the word in the E register into the accumulator (Ac) location specified by the address stored in the M register. During this state (30101), M is tested. If $M=6$, then the next K state defined will be (20003) which, it will be recalled, is the initial state of the GENERAL K state sequence. If on the other hand, M does not equal six, then during the succeeding state (30003), the content of the M register will be incremented. After state (30003), the sequence will loop back to state (31142) which will transfer a subsequent word from the addressed data register into the accumulator.

From the foregoing, the manner of execution of each of the I level instructions should now be appreciated. As previously pointed out, the I level instruction codes are wired into the memory in a sequence defining an I level program, each wired-in I level instruction code being identifiable by a unique program count. The I level program should also be considered as being comprised of a plurality of sub-programs or subroutines, each of which is made up of several I level instruction codes which, when executed together, perform a specific function, as for example one of the operations specified by an O board key. In the course of operation of the calculator, the program count is normally incremented by one after each I level instruction has been executed, thus executing the I level instructions in sequence. However, as has been seen, many branch points can be defined which enable the program count to be forced out of sequence depending upon defined conditions.

Figure 5:
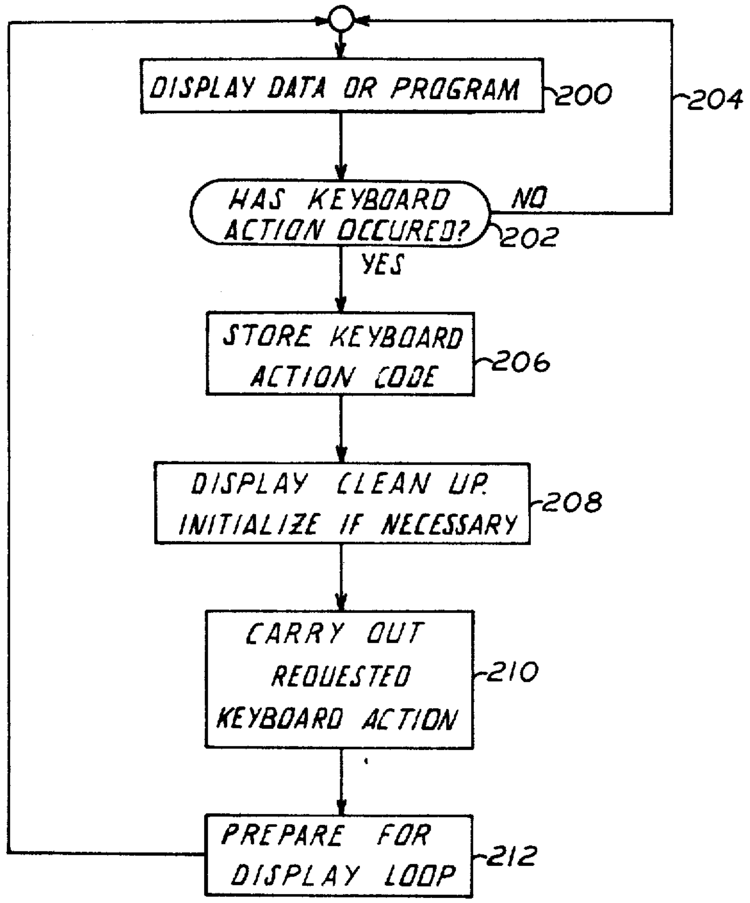
FIGURE 5 is a flow chart illustrating the general operation of a calculator in accordance with the present invention.

The flow chart of FIGURE 5 generally describes the overall operation of the calculator, illustrating the major functions performed by the execution of sequences of I level instructions. More particularly, box 200 represents an output or display operation which presents a visual display for the user of either the data in specified ones of the main memory registers or steps in the user program stored in the second half of the main memory. After all of the I level instructions necessary to perform the operation represented by box 200 are executed, the test represented by box 202 is made. That is, the calculator determines whether the user has actuated any keys. If no keys have been actuated, then the calculator returns via path 204 to box 200. Thus, in the absence of keyboard action, the calculator will loop through boxes 200 and 202, thereby maintaining the display for the user.

In the event a keyboard action has occurred when tested by box 202, then the code representing the keyboard action is stored. This operation is represented by box 206. Thereafter, various housekeeping functions are performed as represented by box 208 and when they are completed, the action specified by the actuated key is performed. This is represented by box 210. Thereafter, more housekeeping functions are performed as represented by box 212 prior to returning to box 200 in which a display is again presented for the user.

It will be appreciated that the flow chart of FIGURE 5 is very general in nature and that each of the boxes illustrated therein may require the execution of more than 100 I level instructions in order to carry out the specified operation. Inasmuch as it would not be practical to set forth in the body of the specification a sequence comprised of several hundred I level instructions required to fully perform the actions represented by FIGURE 5, instead a short sequence comprised of several I level instructions included in box 210 utilized to execute a STORE O board operation will be set forth. A typical sequence of wired-in I level instructions is set forth in Appendix B.

Figure 6:
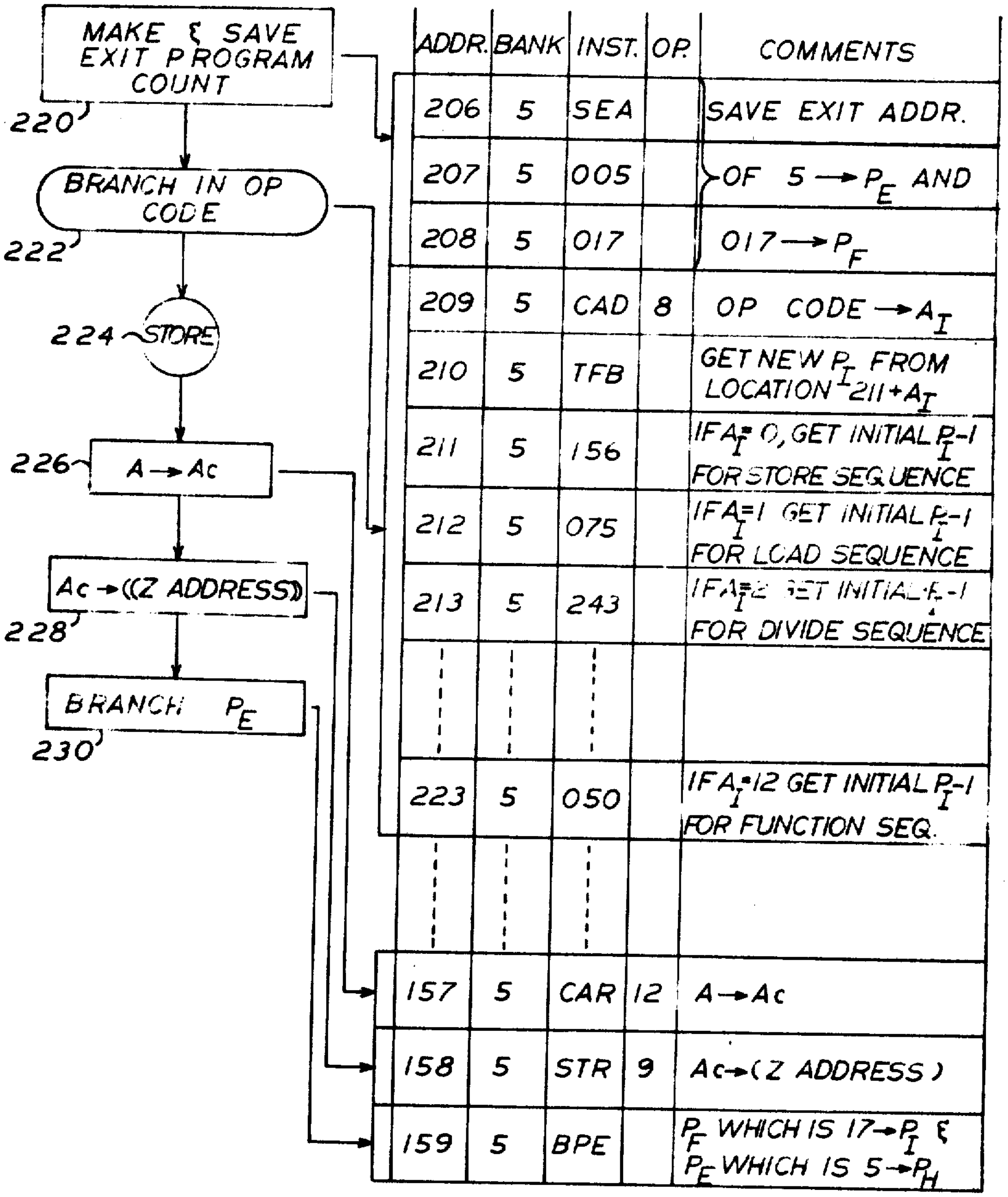
FIGURE 6 is a flow chart illustrating the execution of a typical user level operation.

More particularly, attention is now called to FIGURE 6 which illustrates a flow chart together with the I level instructions required to implement that flow chart. It is again pointed out that the flow chart of FIGURE 6 may represent only a portion of box 210 of the flow chart of FIGURE 5. Let it be assumed as an example, that the sequence of FIGURE 6 starts with a program count defining location 206 in bank 5. Box 220 of FIGURE 6 represents an operation which makes and saves an exit program count. Let it further be assumed, as an example, that this exit program count defines location 17 in bank 5. The operation of box 220 is implemented by the I level instructions indicated.

More particularly, program count 206–5 comprises an SEA instruction which, it will be recalled, indicates that the contents of the following two program counts should be transferred to special locations $P_E$ and $P_F$ respectively. Inasmuch as it has been assumed that the exit program count should define location 17 in bank 5, program count 207–5 defines bank 5 and program count 205–5 defines location 17. Thus, after the execution of program count 208–5, special locations $P_F$ and $P_E$ will respectively store the two portions of the program count it is desired to later return to.

Box 222 represents the next required action and involves preparing for a branch operation dependent upon the code generated by the O board key actuated by the user. Box 222 is implemented by the next program count (i.e. 209–5) which comprises a CAD instruction with a Y field of eight. It will be recalled from the explanation of the memory map of FIGURE 3 that location 71 (i.e. $I_8$) in the first half of the memory stores the operation code; that is, the code representing an actuated O board key. It will also be recalled from the description of the CAD instruction, that its use together with a Y field of eight will function to transfer the content of location 71 (i.e. where $Y=8$ and $8Y+7=71$) to special location $A_I$. Thus after the I level instruction defined by program count 209–5 has been executed, the code describing the next O board operation to be performed is stored in the low order four bits of special location $A_I$ in accordance with the following Table VII:

TABLE VII

| Code: | Operation |
|---|---|
| (0) 0000 | STORE |
| (1) 0001 | LOAD |
| (2) 0010 | DIVIDE |
| (3) 0011 | SQUARE ROOT |
| (4) 0100 | JUMP |
| (5) 0101 | ADD |
| (6) 0110 | MULTIPLY |
| (7) 0111 | TRANSFER |
| (8) 1000 | SUBTRACT |
| (9) 1001 | CLEAR |
| (10) 1010 | QUERY |
| (11) 1011 | DISPLAY |
| (12) 1100 | FUNCTION |

The next I level instruction, defined by program count 210–5, is a TFB instruction which, it will be recalled, permits a branch to any one of the sixteen subsequent I level program counts depending upon the low order four bits stored in location $A_I$. That is, the new program count is equal to the present program count plus the content of location $A_I$. Assuming that a STORE operation is to be performed, then location $A_I$ will contain all zeroes and program count 211–5 will in fact be defined after program count 210–5. Program count 211–5 specifies a program count 156–5 which constitutes the program count preceding the first program count in the STORE subroutine or I level instruction sequence. Accordingly, after the TFB instruction has been executed, the program count 157–5 storing the initial I level instruction of the STORE sequence is accessed.

As shown in FIGURE 6, the initial I level instruction in the STORE sequence is a CAR instruction. The CAR instruction specifies a Y field of twelve. As a consequence of specifying this Y field, the content (it will be recalled from Table I that location $I_{12}$ stores the content 80) of main memory location $I_{12}$ (i.e. 103, where $Y=12$ and $8Y+7=103$) is accessed and used to identify the starting address of a data register (the constant 80 identifies data register A) whose content is then transferred to the accumulator ($Ac$). This action is represented by box 226. This program count 158–5 storing the STR I level instruction is next accessed. It can be noted in FIGURE 6 that the STR instruction specifies a Y field of nine. In response to this instruction, the Z address specified by the user, which it will be recalled from Table I is stored in location $I_9$ (i.e. 79, where $Y=9$ and $8Y+7=79$), is accessed and used to identify the starting address of a data register into which the contents of accumulator ($Ac$) are stored. This action is represented by box 228. It should be appreciated that after the I level instruction of program count 158–5 has been executed, the STORE operation has been essentially completed. The next program count (159–5) stores a BPE I level instruction which, it will be recalled, transfers the contents of special locations $P_E$ and $P_F$ to locations $P_H$ and $P_I$. Thus, the I level instruction of the program count following the previously stored exit program count (17—5) can now be executed. This last action of returning to the appropriate I level program count is represented by box 230.

From the foregoing description of FIGURE 6, it should now be appreciated how a sequence of I level instructions can be executed to perform various ones of the O board operations previously discussed. Although many of the O board operations require significantly longer I level instruction sequences, they are all performed by chaining appropriate I level instruction codes together as shown in FIGURE 6.

In order to demonstrate the manner in which the keyboard can be actuated to permit a user to solve a problem, attention is now called to Table VIII which defines the program steps required to calculate the value of the function $Y^n$ for various values of Y and $n$. For the sake of simplicity, it has been assumed in the construction of the program of Table VIII that Y will not be equal to zero and $n$ will not be a negative number. The program steps illustrated can actually represent key actuations when the calculator is operated in a MANUAL or SAMPLE PROBLEM mode, for example, or can comprise stored program steps if the calculator is operating in one of the automatic modes, such as the RUN mode.

TABLE VIII

| Step No. | K Board | Mark No. | Z Addr. | O Board | Comments |
|---|---|---|---|---|---|
| 1 | Enter Y | 0 | 1 | T | Y→Z1. |
| 2 | Enter n |  | 2 | T | n→Z2. |
| 3 |  |  | A | C | O→A. |
| 4 |  |  | 2 | — | A—Z2=O-n→A. |
| 5 |  |  | 3 | S | A→Z3; O-n→Z3. |
| 6 |  |  | 1 | Q | If A is neg. branch to mark 1. |
| 7 |  |  | 1 | L | Z1→A; Y→A. |
| 8 |  |  | 1 | ÷ | Y/Y→A; 1→A. |
| 9 |  |  | 4 | S | A→Z4; 1→Z4. |
| 10 |  |  | 3 | J | Jump to mark 3. |
| 11 |  | 1 | 1 | L | Z1→A; |
| 12 |  |  | 1 | ÷ | 1→A. |
| 13 |  |  | 4 | S | 1→Z4. |
| 14 |  | 2 | 4 | L | Z4→A. |
| 15 |  |  | 1 | X | (Z1)(Z4)→A. |
| 16 |  |  | 4 | S | A→Z4. |
| 17 |  |  | 1 | L | Z1→A Y→A. |
| 18 |  |  | 1 | ÷ | 1→A. |
| 19 |  |  | 3 | + | 1+Z3→A. |
| 20 |  |  | 3 | S | A→Z3. |
| 21 |  |  | 2 | Q | If A is neg. branch to mark 2. |
| 22 |  | 3 | 4 | D | Display Z4. |
| 23 |  |  | 0 | J | Jump to step O; wait for new Y. |

It can be seen that program step 1 requires initially that a value of Y be specified by the user via the K board. As previously noted, the mark M0 is automatically associated with the initial program step by the calculator. A Z address Z1 is next specified and an O board operation, TRANSFER, is thereafter specified. As a consequence of these actions, the specified Y value is transferred into data register Z1.

Step 2 requires the user to specify a value of $n$ via the K board. The address Z2 is next specified and the O board operation TRANSFER is thereafter specified which transfers the specified $n$ value to data register Z2. Step 3 clears the accumulator A. Step 4 defines a SUBTRACT operation which subtracts the number stored in data register Z2 from the number (i.e. 0) held in the accumulator A. As a consequence, the accumulator A will store a negative number if $n$ is positive.

Step 5 specifies data register Z3 ad a STORE operation which stores the information stored in the accumulator A in data register Z3. Step 6 defines the O board operation, QUERY, and specifies mark 1. That is, in response to the QUERY operation, if the quantity stored in the accumulator A is negative (meaning that $n$ is positive), then the program branches to mark 1 which in this instance corresponds to program step 11. In the event the quantity in the accumulator A is not negative, this indicates that $n$ is equal to zero (it being recalled that the program was constructed on the assumption that the negative values of $n$ would not be used) and program step 7 is thereafter performed.

Program step 7 specifies that the content of data register Z1 be loaded into the accumulator A. Program step 8 specifies that the content of the accumulator A be divided by the content of data register Z1, thus leaving a quotient equal to one in the accumulator A. Program step 9 stores the content (i.e. 1) in data register Z4. Program step 10 specifies a JUMP instruction indicating a branching to mark 3 which, it will be noted, is associated with program step 22. Program step 22 specifies that the content of data register Z4 be displayed. Thus, a 1, that is the value of the function $Y^n$ where $n=0$, is displayed. After program step 22, program step 23 will be executed which defines a JUMP instruction to mark M0; that is, the initial program step in the sequence of Table VIII. The calculator will wait in program step 1 until a new value of Y is entered.

In the event the value of $n$ specified is not equal to 0, then after program step 6, the calculator will jump to mark M1 associated with program step 11. Program step 11 specifies a LOAD instruction which transfers the content of data register Z1 to the accumulator A. Program step 12 divides the content of the accumulator A by the content of data register Z1 thereby leaving a quotient of 1 in the accumulator A. Program step 13 defines a STORE instruction which transfers the content of the accumulator A, i.e. 1, to data register Z4. Therefore, at the completion of program step 13, data register Z1 will store Y, data register Z2 will store $n$, and data register Z4 will store a 1.

Program step 14 has a mark M2 associated with it. This program step defines a LOAD instruction which brings the content of data register Z4 into the accumulator A. If program step 14 is entered from program step 13, then the content of data register Z4 is equal to one. However, as will be seen hereinafter, program step 14 can be entered from program step 21 and in this case data register Z4 will contain the quantity $(Y)^{1-1}$ where $i$ represents the number of iterations through program step 14 that the calculator has made.

Program step 15 defines a MULTIPLY operation in which the content of data register Z1 (i.e. Y) is multiplied by the content of data register Z4 with the product being transferred into the accumulator A. Program step 16 stores the content of the accumulator A, i.e. the product $Y^1$, in data register Z4.

Program step 17 loads the content of data register Z1 into the accumulator A. Program step 18 divides the accumulator A content by the content of data register Z1 thereby leaving a quotient of 1 in the accumulator A. Program step 19 then defines an ADD operation which adds the 1 in the accumulator A to the content of data register Z3. It should be appreciated that data register Z3 will at this time store the quantity $-n+(i-1)$ where $i$ again can be considered as representing the number of iterations through program step 14. As a consequence, after program step 19 has been executed, the accumulator A will store the quantity $i-n$ which is then transferred to data register Z3 during program step 20. Program step 21 defines a QUERY operation which tests to determine whether the content of the accumulator A is negative. If it is negative, this means that it is necessary to again execute program steps 14 through 20 until the number of iterations $i$ is equal to $n$. When $i$ is equal to $n$, then program step 22 will be defined after program step 21. As previously pointed out, program step 22 causes the content of data register Z4 to be displayed. Data register Z4 of course stores the value of the function $Y^n$.

It will be recalled from Table II that data could be displayed for the user on output device 14 by executing certain I level instructions, e.g. the DAD instruction. The execution of this instruction displays the character identified by the low order five bits of special location $A_I$. Another display instruction, i.e. the DIR instruction is used when it is desired to display the content of one of the data registers. Both of the display instructions (i.e. DAD and DIR), control both the vertical sweep and intensity of a cathode ray tube beam, for example. The beam horizontal sweep is preferably initiated by the KLT instruction and terminated by the CSK NKA instruction.

Figure 7:
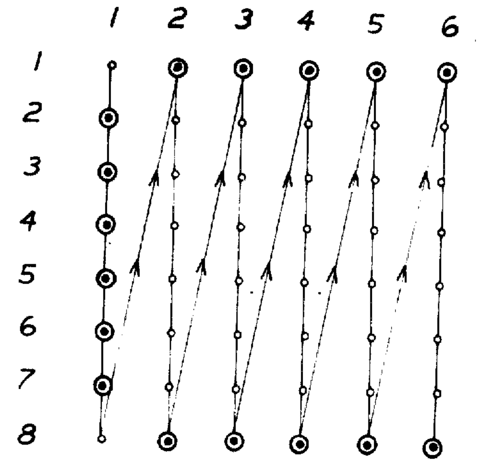
FIGURE 7 illustrates a matrix of display points which are selectively illuminated to represent a character.
Figure 8:
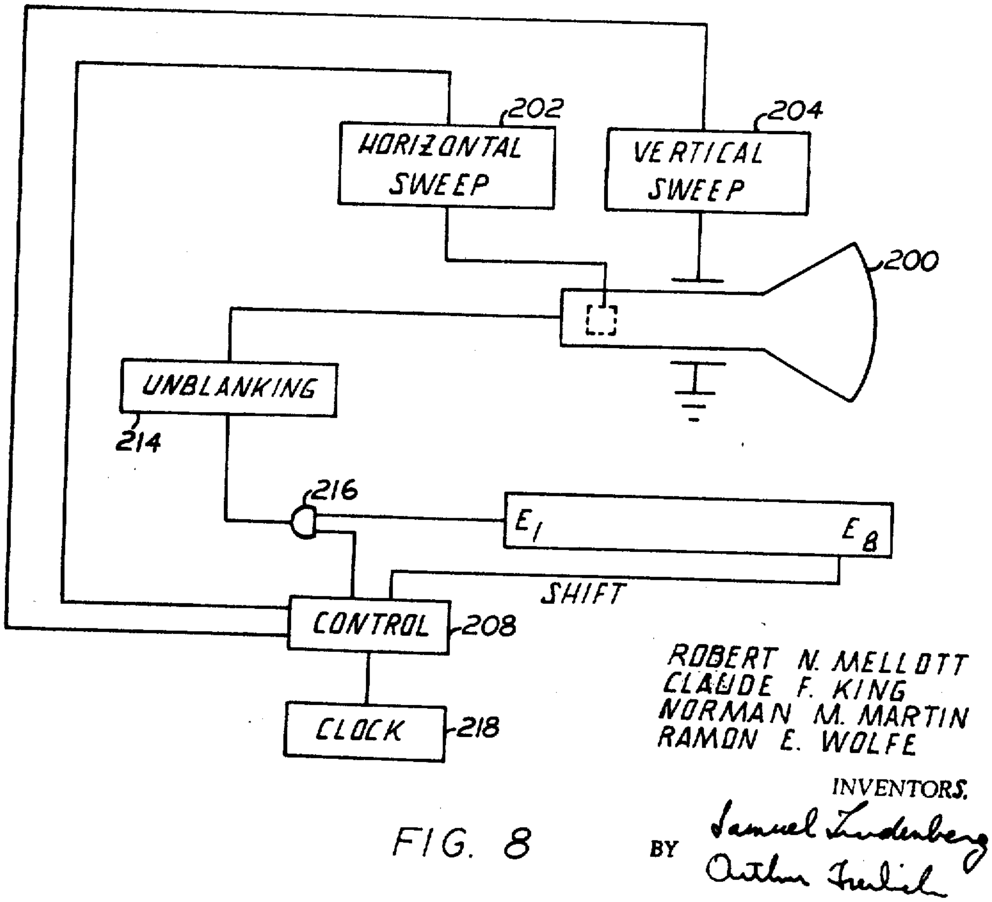
FIGURE 8 is a block diagram of an apparatus for displaying characters of the form illustrated in FIGURE 7.

Regardless of which display instruction is employed, character information is always entered into the E register from the character memory 103 and then utilized by the display apparatus as shown in FIGURE 8. Briefly, as can be seen from the appropriate K state chart in Appendix A, in the execution of the DAD instruction, the content of special location $A_I$ is accessed and enters the E register. As will be recalled from FIGURE 4, when a display instruction is being executed, the low order five bits of the E register are employed to select, via decoding circuits 178 and 184, one of thirty-two character write wires threading the memory 103. It will also be recalled that the character memory 103 is comprised of forty-eight cores each corresponding to a different point in a matrix of display points as represented by FIGURE 7. The matrix of display points is created on the face of cathode ray tube 200 (FIGURE 8) by scanning the cathode ray tube beam as shown in FIGURE 7. At each display point, the beam is either unblanked or left blanked dependent on the state of the core in memory 103 corresponding thereto. Thus, in order to represent the character "C," for example, as shown in 7, the cathode ray tube beam is successively swept through columns 1 through 6. In column 1, as can be seen, the beam is unblanked at each of rows 2 through 7 and in columns 2 through 6, the beam is unblanked at each of rows 1 and 8.

In accordance with a preferred embodiment of the present invention, information representing a character to be displayed is written into the character memory 103 by providing drive current to the write winding selected by the decoding circuits 178 and 184. This information which is used for controlling the unblanking of the cathode ray tube beam is read out of the character memory into the E register eight bits at a time. Thus, the eight bits defining the matrix column 1 information is read into the E register and the beam is then swept through column 1 as the control bits are shifted out of the E register one bit at a time in synchronism with the beam movement. The M register is then incremented to read out eight additional bits into the E register while the beam is moving from the bottom of matrix column 1 to the top of matrix column 2 to control unblanking as the beam is swept through column 2. Similarly, the M register is incremented and eight additional bits are read into the E register in order to control unblanking while the beam is swept through the other matrix columns.

FIGURE 8 illustrates the manner in which bits are read out of the E register to control beam unblanking. Note that the cathode ray tube 200 is provided with horizontal and vertical deflection plates respectively controlled by horizontal and vertical sweep circuits 202 and 204. The vertical sweep circuit 204 is controlled by a control means 208 in response to one of the display instructions and moves the beam downwardly in a vertical direction through eight display points constituting a display matrix column. As is apparent from the display instruction K state sequences, after K state 00XXX is defined, the vertical sweep circuit 204 is reset and the beam is then swept downwardly through a subsequent column. While the beam is swept vertically, it is also swept horizontally by circuit 202 whose action was previously initiated by the KLT instruction. Accordingly, the horizontal and vertical sweep circuits 202 and 204 sweep the beam along the path illustrated in FIGURE 7. Concurrently, the beam unblanking circuit 214 is controlled by gate 216 which is responsive to bits being shifted from stage $E_1$ of the E register. E register shifting is controlled by control means 208 which is responsive to the output of clock pulse source 218.

It should be recognized that FIGURE 8 only illustrates that portion of the display apparatus actually used to form a character and the information, which is well known to those skilled in the art, required to control the gross positioning of the beam, has been omitted.

From the foregoing, it should be appreciated that a calculator has been disclosed herein which is capable of operating in various modes, manually definable by a user, to solve problems of varying complexity. That is, the user is able to calculate in a manual mode for example, in which the calculator executes each operation as it is designated by the user or the user can designate one of the automatic modes in which event the calculator will execute a stored user level program. Regardless of the mode of operation, all internal processing is performed in response to I level instruction codes read from the memory. The I level instruction codes are wired into the memory (in the same locations used for variable storage) and are read out in sequence except where certain branching conditions are defined. The I level instruction codes can be appropriately wired into the memory in a multitude of different sequences but, as an example only, Appendix B hereof indicates one such exemplary I level sequence. In addition, a preferred form of display apparatus is shown herein which includes a memory having character information wired therein which memory communicates with the same E or exchange register as the other memories. Information for controlling beam unblanking for a specific character is written into the memory by driving current through the appropriate one of a plurality of wires threaded through the character memory.

It will be recalled that in the discussion thus far, the user level operation codes which together form a user level program, have been entered into the second half of the main memory in response to the actuation of keyboard keys. It is specifically pointed out that these operation codes can be entered into the memory in other manners. Thus, for frequently used user level program, the required operation codes are wired into the main memory so that in response to the actuation of a single key identifying the user level program desired, the wired-in operation codes forming that program will be written into the second half of the main memory. The program can then be executed in the manner heretofore described; i.e. in response to each operation code, a sequence of I level instructions is executed, each I level instruction involving a sequence of K states, each describing an elemental operation. It is also pointed out that the user level program, i.e. the operation codes, can be entered into the main memory from some peripheral device such as a punched card or paper or magnetic tape. Again the user level program would be executed as heretofore described.

Although a preferred embodiment of the invention has been specifically disclosed herein, it is appreciated that various modifications and variations falling within the spirit of the invention will readily occur to those skilled in the art. Accordingly, it is not intended that the scope of the invention be limited by the specific embodiment disclosed.

What is claimed is:

1. In an apparatus having a keyboard including a plurality of keys:
- a memory comprised of a plurality of word locations;
- means for selectively writing in any selected word location including means for writing variable information and means for writing a selected one of a plurality of fixedly defined internal instruction codes unique to that selected word location;
- means responsive to the actuation of any one of said keys for accessing a sequence of said internal instruction codes from said memory unique to the actuated key;
- a source of clock pulses; and
- means responsive to each of said accessed internal instruction codes for executing a sequence of elemental operations, each in response to one of said clock pulses, with respect to information stored in said memory.

2. The apparatus of claim 1 wherein said memory is comprised of a plurality of magnetic cores arranged to define a plurality of word locations and wherein said means for selectively writing includes:
- a plurality of wires fixedly threaded through the cores of each of said word locations, each wire defining one of said internal instruction codes;
- an information register;
- an address register for selecting any one of said word locations;
- means for writing into the selected word location information from said information register and means for writing into the selected word location a code defined by any one of said wires.

3. A calculator comprising:
- a first memory including a plurality of word locations;
- a word storage register;
- each of said plurality of first memory word locations having means associated therewith defining a fixed set of words;
- a first actuatable means for writing a word stored in said word storage register into a selected one of said plurality of first memory word locations;
- a second actuatable means for writing in any selected one of said plurality of first memory word locations a selected one of the words of the fixed set of words associated with that location; and
- a third actuatable means for reading the word stored in any selected one of said first memory word locations into said word storage register.

4. The calculator of claim 3 wherein said first memory is comprised of a plurality of storage elements;
- said first actuatable means including an inhibit means responsive to the content of said word storage register for inhibiting switching in the storage elements of said first memory; and
- said second actuatable means including a different inhibit wire coupled to the storage elements of each first memory word location for each different fixed word associated therewith.

5. A calculator comprising:
- a first memory including a plurality of word locations;
- a word storage register;
- each of said plurality of first memory word locations having means associated therewith defining a fixed set of words;

- a first actuatable means for writing a word stored in said word storage register into a selected one of said plurality of first memory word locations;
- a second actuatable means for writing in any selected one of said plurality of first memory word locations a selected one of the words of the fixed set of words associated with that location;
- a third actuatable means for reading the word stored in any selected one of said first memory word locations into said word storage register;
- a second memory comprised of a group of word locations;
- a fourth actuatable means for writing a word stored in said word storage register into a selected one of said group of second memory word locations; and
- a fifth actuatable means for reading the word stored in any selected one of said second memory word locations into said word storage register.

6. The calculator of claim 5 wherein said fixed sets of words defined for each of said plurality of first memory word locations is comprised of instruction words;
- an instruction register; and
- a sixth actuatable means for transferring information from said word storage register into said instruction register.

7. The calculator of claim 6 including a state register;
- a source of clock pulses; and
- control means responsive to each of said clock pulses and to the content of said instruction and state registers for modifying the content of said state register and for appropriately actuating said first, second, third, fourth, fifth and sixth actuatable means.

8. The calculator of claim 6 wherein each of a plurality of groups of successive first memory word locations defines a data register; and
- means responsive to certain instruction information stored in said instruction register for identically operating on all of the word locations in an identified data register.

9. The calculator of claim 3 including a keyboard comprised of a plurality of keys, said keys being actuatable to generate identification codes; and
- means selectively responsive to the actuation of said keys for storing a record of the sequence of actuation thereof in said first memory.

10. The calculator of claim 3 including a keyboard comprised of both numeric and operation keys;
- means responsive to the actuation of said keys for entering information into said first memory and for performing operations with respect thereto; and
- means for storing a sequence of identification codes in said first memory describing a sequence of key actuations.

11. The calculator of claim 10 including means for selectively associating a different marker code with each of a plurality of said identification codes;
- means normally accessing said identification codes from said first memory in sequence; and
- means responsive to the accessing of certain ones of said identification codes for next accessing the code having a designated one of said marker codes associated therewith.

12. The calculator of claim 3 including a character memory;
- a plurality of character write wires each uniquely fixedly coupled to said character memory;
- means for selectively energizing said character write wires for writing information uniquely related thereto into said character memory; and
- actuatable means for reading information stored in said character memory into said word storage register.

13. The calculator of claim 12 including a display device having an actuatable writing means;
- means for moving said writing means through a matrix of display points; and means for selectively actuating said writing means in response to information stored in said word register.

14. A calculator comprising:

a first memory including a plurality of word locations;

a word storage register;

each of said plurality of first memory word locations having means associated therewith defining a fixed set of words;

a first actuatable means for writing a word stored in said word storage register into a selected one of said plurality of first memory word locations;

a second actuatable means for writing in any selected one of said plurality of first memory word locations a selected one of the words of the fixed set of words associated with that location;

a third actuatable means for reading the word stored in any selected one of said first memory word locations into said word storage register;

said plurality of word locations including a first group of word locations, each capable of storing a user level operation code;

means controlling said third actuatable means for reading said first group of word locations in sequence;

means responsive to each read operation code for controlling said second actuatable means for successively writing into selected word locations selected fixed words associated with those locations; and means controlling said third actuatable means for reading said written fixed words from said selected word locations in sequence.

15. The combination of claim 14 wherein said fixed words comprise internal instruction codes; and means responsive to each read internal instruction code for executing a sequence of elemental operations identified thereby.

16. The combination of claim 15 wherein each of said operation codes is defined by one of the words in the fixed set of words associated with the location in which that operation code can be stored.

17. The combination of claim 15 including a plurality of actuatable keys; and means responsive to the actuation of said keys for storing said operation codes in said first group of word locations.

18. Apparatus for displaying characters comprising:

a cathode ray tube including means for generating an electron beam;

a memory including *mn* storage elements;

a plurality of write means each fixedly associated with said memory and actuatable to store a unique set of *mn* bits therein;

means for selectively reading the set of *mn* bits stored in said memory;

means for deflecting said electron beam through a matrix comprised of *mn* points arranged in *m* columns and *n* rows; and intensity control means responsive to each of said *mn* bits read from said memory for controlling the intensity of said electron beam at a corresponding one of said matrix points.

19. The apparatus of claim 18 wherein said *mn* storage elements are arranged to define *m* columns and *n* rows;

a shift register including *n* stages;

said means for selectively reading including means for reading said *n* rows of storage elements in sequence and for storing the bits read therefrom in said shift register; and means for sequentially shifting the bits stored in said register to said intensity control means in synchronism with the deflection of said beam through said matrix.

References Cited

UNITED STATES PATENTS

| | | | |
|---|---|---|---|
| Re. 25,599 | 6/1964 | Tate | 340—172.5 |
| 2,920,312 | 1/1960 | Gordon et al. | 340—174 |
| 3,108,257 | 10/1963 | Buchholz | 340—172.5 |
| 3,187,321 | 6/1965 | Kameny | 340—345 |
| 3,293,614 | 12/1966 | Fenimore et al. | 340—172.5 |
| 3,302,179 | 1/1967 | Osborn et al. | 340—172.5 |
| 3,351,929 | 11/1967 | Wagner | 340—324 |
| 3,355,714 | 11/1967 | Culler | 340—172.5 |

PAUL J. HENON, Primary Examiner

RONALD F. CHAPURAN, Assistant Examiner

U.S. Cl. X.R.

340—324